(12) United States Patent
Weber

(10) Patent No.: US 10,144,669 B2
(45) Date of Patent: Dec. 4, 2018

(54) SELF-OPTIMIZING CHEMICAL STRENGTHENING BATH FOR GLASS

(75) Inventor: Douglas J. Weber, Arcadia, CA (US)

(73) Assignee: APPLE INC., Cupertino, CA (US)

( * ) Notice: Subject to any disclaimer, the term of this patent is extended or adjusted under 35 U.S.C. 154(b) by 1251 days.

(21) Appl. No.: 13/301,670

(22) Filed: Nov. 21, 2011

(65) Prior Publication Data

US 2013/0128416 A1    May 23, 2013

(51) Int. Cl.
*C03C 21/00* (2006.01)

(52) U.S. Cl.
CPC .................. *C03C 21/002* (2013.01)

(58) Field of Classification Search
CPC ...... C03C 21/00; C03C 21/001; C03C 21/002
See application file for complete search history.

(56) References Cited

U.S. PATENT DOCUMENTS

| | | | |
|---|---|---|---|
| 2,643,020 A | 6/1953 | Dalton | |
| 3,415,637 A | 12/1968 | Glynn | |
| 3,441,398 A | 4/1969 | Hess | |
| 3,467,508 A | 9/1969 | Loukes et al. | |
| 3,498,773 A | 3/1970 | Due et al. | |
| 3,558,415 A | 1/1971 | Rieser et al. | |
| 3,607,172 A | 9/1971 | Poole et al. | |
| 3,619,240 A | 11/1971 | Toussaint et al. | |
| 3,626,723 A | 12/1971 | Plumat | |
| 3,652,244 A | 3/1972 | Plumat | |
| 3,753,840 A | 8/1973 | Plumat | |
| 3,798,013 A | 3/1974 | Inoue et al. | |
| 3,843,472 A | 10/1974 | Toussaint et al. | |
| 3,857,689 A | 12/1974 | Koizumi et al. | |
| 3,926,605 A | 12/1975 | Kunkle | |
| 3,951,707 A | 4/1976 | Kurtz et al. | |
| 4,015,045 A | 3/1977 | Rinehart | |
| 4,052,184 A | 10/1977 | Anderson | |
| 4,119,760 A | 10/1978 | Rinehart | |
| 4,156,755 A | 5/1979 | Rinehart | |
| 4,165,228 A | 8/1979 | Ebata et al. | |
| 4,148,082 A | 12/1979 | Ganswein et al. | |
| 4,212,919 A | 7/1980 | Hoda | |
| 4,218,230 A | 8/1980 | Hogan | |
| 4,346,601 A | 8/1982 | France | |

(Continued)

FOREIGN PATENT DOCUMENTS

| | | |
|---|---|---|
| AT | 283 630 B | 10/1970 |
| CN | 1277090 A | 12/2000 |

(Continued)

OTHER PUBLICATIONS

Chemically Strengthened Glass, Wikipedia, Apr. 19, 2009, http://en/wikipedia.org/w/index.php?title=Chemically_strengthened_glass &oldid=284794988.

(Continued)

*Primary Examiner* — Cynthia Szewczyk
(74) *Attorney, Agent, or Firm* — Brownstein Hyatt Farber Schreck, LLP

(57) ABSTRACT

Apparatus, systems and methods for improving strength of a thin glass member for an electronic device are disclosed. In one embodiment, the glass member can be strengthened chemically using a monitored ion exchange process in which the glass member is disposed in a glass ion exchange bath. In one embodiment, the glass member can pertain to a cover glass for housings of electronic devices.

21 Claims, 9 Drawing Sheets

(56) References Cited

U.S. PATENT DOCUMENTS

| | | |
|---|---|---|
| 4,353,649 A | 10/1982 | Kishii |
| 4,425,810 A | 1/1984 | Simon et al. |
| 4,537,820 A | 8/1985 | Nowobilski et al. |
| 4,646,722 A | 3/1987 | Silverstein et al. |
| 4,733,973 A | 3/1988 | Machak et al. |
| 4,842,629 A | 6/1989 | Clemens et al. |
| 4,844,724 A | 7/1989 | Sakai et al. |
| 4,846,868 A | 7/1989 | Aratani |
| 4,849,002 A | 7/1989 | Rapp |
| 4,872,896 A | 10/1989 | LaCourse et al. |
| 4,911,743 A | 3/1990 | Bagby |
| 4,937,129 A | 6/1990 | Yamazaki |
| 4,957,364 A | 9/1990 | Chesler |
| 4,959,548 A | 9/1990 | Kupperman et al. |
| 4,983,197 A | 1/1991 | Froning et al. |
| 4,986,130 A | 1/1991 | Engelhaupt et al. |
| 5,041,173 A | 8/1991 | Shikata et al. |
| 5,104,435 A | 4/1992 | Oikawa et al. |
| 5,129,934 A | 7/1992 | Koss |
| 5,157,746 A | 10/1992 | Tobita et al. |
| 5,160,523 A | 11/1992 | Honkanen et al. |
| 5,254,149 A | 10/1993 | Hashemi et al. |
| 5,269,888 A | 12/1993 | Morasca |
| 5,281,303 A | 1/1994 | Beguin et al. |
| 5,369,267 A | 11/1994 | Johnson et al. |
| 5,411,563 A | 5/1995 | Yeh |
| 5,437,193 A | 8/1995 | Schleitweiler et al. |
| 5,445,871 A | 8/1995 | Murase et al. |
| 5,483,261 A | 1/1996 | Yasutake |
| 5,488,204 A | 1/1996 | Mead et al. |
| 5,525,138 A | 6/1996 | Hashemi et al. |
| 5,625,154 A | 4/1997 | Matsuhiro et al. |
| 5,654,057 A | 8/1997 | Kitayama |
| 5,725,625 A | 3/1998 | Kitayama et al. |
| 5,733,622 A | 3/1998 | Starcke et al. |
| 5,766,493 A | 6/1998 | Shin |
| 5,780,371 A | 7/1998 | Rifqi et al. |
| 5,816,225 A | 10/1998 | Koch et al. |
| 5,825,352 A | 10/1998 | Bisset et al. |
| 5,826,601 A * | 10/1998 | Muraoka et al. ............... 134/2 |
| 5,835,079 A | 11/1998 | Shieh |
| 5,880,411 A | 3/1999 | Gillespie et al. |
| 5,880,441 A | 3/1999 | Gillespie et al. |
| 5,930,047 A | 7/1999 | Gunz et al. |
| 5,953,094 A | 9/1999 | Matsuoka et al. |
| 5,985,014 A | 11/1999 | Ueda et al. |
| 6,050,870 A | 4/2000 | Suginoya et al. |
| 6,114,039 A | 9/2000 | Rifqi |
| 6,120,908 A | 9/2000 | Papanu et al. |
| 6,166,915 A | 12/2000 | Lake et al. |
| 6,188,391 B1 | 2/2001 | Seely et al. |
| 6,245,313 B1 | 6/2001 | Suzuki et al. |
| 6,287,674 B1 | 9/2001 | Verlinden et al. |
| 6,307,590 B1 | 10/2001 | Yoshida |
| 6,310,610 B1 | 10/2001 | Beaton et al. |
| 6,323,846 B1 | 11/2001 | Westerman et al. |
| 6,325,704 B1 | 12/2001 | Brown et al. |
| 6,327,011 B2 | 12/2001 | Kim |
| 6,350,664 B1 | 2/2002 | Haji et al. |
| 6,393,180 B1 | 5/2002 | Farries et al. |
| 6,429,840 B1 | 8/2002 | Sekiguchi |
| 6,437,867 B2 | 8/2002 | Zeylikovich et al. |
| 6,516,634 B1 | 2/2003 | Green et al. |
| 6,521,862 B1 | 2/2003 | Brannon |
| 6,621,542 B1 | 9/2003 | Aruga |
| 6,690,387 B2 | 2/2004 | Zimmerman et al. |
| 6,718,612 B2 | 4/2004 | Bajorek |
| 6,769,274 B2 | 8/2004 | Cho et al. |
| 6,772,610 B1 | 8/2004 | Albrand et al. |
| 6,810,688 B1 | 11/2004 | Duisit et al. |
| 6,936,741 B2 | 8/2005 | Munnig et al. |
| 6,955,971 B2 | 10/2005 | Ghyselen et al. |
| 6,996,324 B2 | 2/2006 | Hiraka et al. |
| 7,012,700 B2 | 3/2006 | De Groot et al. |
| 7,013,709 B2 | 3/2006 | Hajduk et al. |
| 7,015,894 B2 | 3/2006 | Morohoshi |
| 7,070,837 B2 | 7/2006 | Ross |
| 7,166,531 B1 | 1/2007 | van Den Hoek et al. |
| 7,184,064 B2 | 2/2007 | Zimmerman et al. |
| 7,461,564 B2 | 12/2008 | Glaesemann |
| 7,558,054 B1 | 7/2009 | Prest et al. |
| 7,626,807 B2 | 12/2009 | Hsu |
| 7,663,607 B2 | 2/2010 | Hotelling et al. |
| 7,810,355 B2 | 10/2010 | Feinstein et al. |
| 7,872,644 B2 | 1/2011 | Hong et al. |
| 7,918,019 B2 | 4/2011 | Chang et al. |
| 8,013,834 B2 | 9/2011 | Kim |
| 8,110,268 B2 | 2/2012 | Hegemier et al. |
| 8,111,248 B2 | 2/2012 | Lee et al. |
| 8,312,743 B2 | 11/2012 | Pun et al. |
| 8,393,175 B2 | 3/2013 | Kohli et al. |
| 8,551,283 B2 | 10/2013 | Pakula et al. |
| 8,673,163 B2 | 3/2014 | Zhong |
| 8,684,613 B2 | 4/2014 | Weber et al. |
| 8,824,140 B2 | 9/2014 | Prest |
| 2002/0035853 A1 | 3/2002 | Brown et al. |
| 2002/0105793 A1 | 8/2002 | Oda |
| 2002/0155302 A1 | 10/2002 | Smith et al. |
| 2002/0157199 A1 | 10/2002 | Piltingsrud |
| 2003/0024274 A1 | 2/2003 | Cho et al. |
| 2003/0057183 A1 | 3/2003 | Cho et al. |
| 2003/0077453 A1 | 4/2003 | Oaku et al. |
| 2003/0234771 A1 | 12/2003 | Mulligan et al. |
| 2004/0051944 A1 | 3/2004 | Stark |
| 2004/0119701 A1 | 6/2004 | Mulligan et al. |
| 2004/0137828 A1 | 7/2004 | Takahashi et al. |
| 2004/0142118 A1 | 7/2004 | Takechi |
| 2004/0163414 A1 | 8/2004 | Eto et al. |
| 2005/0058423 A1 | 3/2005 | Brinkmann et al. |
| 2005/0105071 A1 | 5/2005 | Ishii |
| 2005/0135724 A1 | 6/2005 | Helvajian et al. |
| 2005/0174525 A1 | 8/2005 | Tsuboi |
| 2005/0193772 A1 | 9/2005 | Davidson et al. |
| 2005/0245165 A1 | 11/2005 | Harada et al. |
| 2005/0259438 A1 | 11/2005 | Mizutani |
| 2005/0285991 A1 | 12/2005 | Yamazaki |
| 2006/0026521 A1 | 2/2006 | Hotelling et al. |
| 2006/0055936 A1 | 3/2006 | Yun et al. |
| 2006/0063351 A1 | 3/2006 | Jain |
| 2006/0070694 A1 | 4/2006 | Rehfeld et al. |
| 2006/0097991 A1 | 5/2006 | Hotelling et al. |
| 2006/0197753 A1 | 9/2006 | Hotelling et al. |
| 2006/0227331 A1 | 10/2006 | Vollmer et al. |
| 2006/0238695 A1 | 10/2006 | Miyamoto |
| 2006/0250559 A1 | 11/2006 | Bocko et al. |
| 2006/0268528 A1 | 11/2006 | Zadesky et al. |
| 2006/0292822 A1 | 12/2006 | Xie |
| 2006/0294420 A1 | 12/2006 | Schneider |
| 2007/0003796 A1 | 1/2007 | Isono et al. |
| 2007/0013822 A1 | 1/2007 | Kawata et al. |
| 2007/0029519 A1 | 2/2007 | Kikuyama et al. |
| 2007/0030436 A1 | 2/2007 | Sasabayashi |
| 2007/0039353 A1 | 2/2007 | Kamiya |
| 2007/0046200 A1 | 3/2007 | Fu et al. |
| 2007/0063876 A1 | 3/2007 | Wong |
| 2007/0089827 A1 | 4/2007 | Funatsu |
| 2007/0122542 A1 | 5/2007 | Halsey et al. |
| 2007/0132737 A1 | 6/2007 | Mulligan et al. |
| 2007/0196578 A1 | 8/2007 | Karp et al. |
| 2007/0236618 A1 | 10/2007 | Magg et al. |
| 2008/0020919 A1 | 1/2008 | Murata |
| 2008/0026260 A1 | 1/2008 | Kawai |
| 2008/0074028 A1 | 3/2008 | Ozolins et al. |
| 2008/0094716 A1 | 4/2008 | Ushiro et al. |
| 2008/0135157 A1 | 6/2008 | Higuchi |
| 2008/0158181 A1 | 7/2008 | Hamblin et al. |
| 2008/0202167 A1 | 8/2008 | Cavallaro et al. |
| 2008/0230177 A1 | 9/2008 | Crouser et al. |
| 2008/0243321 A1 | 10/2008 | Walser et al. |
| 2008/0261057 A1 | 10/2008 | Slobodin |
| 2008/0264176 A1 | 10/2008 | Bertrand et al. |
| 2008/0286548 A1 | 11/2008 | Ellison et al. |
| 2009/0046240 A1 | 2/2009 | Bolton |
| 2009/0067141 A1 | 3/2009 | Dabov et al. |

(56) References Cited

U.S. PATENT DOCUMENTS

| | | |
|---|---|---|
| 2009/0091551 A1 | 4/2009 | Hotelling et al. |
| 2009/0096937 A1 | 4/2009 | Bauer et al. |
| 2009/0153729 A1 | 6/2009 | Hiltunen et al. |
| 2009/0162703 A1 | 6/2009 | Kawai |
| 2009/0197048 A1 | 8/2009 | Amin et al. |
| 2009/0202808 A1 | 8/2009 | Glaesemann et al. |
| 2009/0220761 A1 | 9/2009 | Dejneka et al. |
| 2009/0257189 A1 | 10/2009 | Wang et al. |
| 2009/0324899 A1 | 12/2009 | Feinstein et al. |
| 2009/0324939 A1 | 12/2009 | Feinstein et al. |
| 2010/0009154 A1 | 1/2010 | Allan et al. |
| 2010/0024484 A1* | 2/2010 | Kashima ............... B24B 9/08 65/29.14 |
| 2010/0028607 A1 | 2/2010 | Lee et al. |
| 2010/0035038 A1 | 2/2010 | Barefoot et al. |
| 2010/0053632 A1 | 3/2010 | Alphonse et al. |
| 2010/0062284 A1 | 3/2010 | Watanabe et al. |
| 2010/0119846 A1 | 5/2010 | Sawada |
| 2010/0137031 A1 | 6/2010 | Griffin et al. |
| 2010/0154992 A1 | 6/2010 | Feinstein et al. |
| 2010/0167059 A1 | 7/2010 | Hasimoto et al. |
| 2010/0171920 A1 | 7/2010 | Nishiyama |
| 2010/0179044 A1 | 7/2010 | Sellier et al. |
| 2010/0206008 A1 | 8/2010 | Harvey et al. |
| 2010/0215862 A1 | 8/2010 | Gomez et al. |
| 2010/0216514 A1 | 8/2010 | Smoyer et al. |
| 2010/0224767 A1 | 9/2010 | Kawano et al. |
| 2010/0265188 A1 | 10/2010 | Chang et al. |
| 2010/0279067 A1 | 11/2010 | Sabia et al. |
| 2010/0285275 A1 | 11/2010 | Baca et al. |
| 2010/0296027 A1 | 11/2010 | Matsuhira et al. |
| 2010/0315570 A1 | 12/2010 | Matthew et al. |
| 2010/0321305 A1 | 12/2010 | Chang et al. |
| 2011/0003619 A1 | 1/2011 | Fujii |
| 2011/0012873 A1 | 1/2011 | Prest et al. |
| 2011/0019123 A1 | 1/2011 | Prest et al. |
| 2011/0019354 A1* | 1/2011 | Prest .................. C03C 19/00 361/679.21 |
| 2011/0030209 A1 | 2/2011 | Chang et al. |
| 2011/0063550 A1 | 3/2011 | Gettemy et al. |
| 2011/0067447 A1 | 3/2011 | Zadesky et al. |
| 2011/0072856 A1 | 3/2011 | Davidson et al. |
| 2011/0102346 A1 | 5/2011 | Orsley et al. |
| 2011/0159321 A1 | 6/2011 | Eda et al. |
| 2011/0164372 A1 | 7/2011 | McClure et al. |
| 2011/0182084 A1 | 7/2011 | Tomlinson |
| 2011/0186345 A1 | 8/2011 | Pakula et al. |
| 2011/0188846 A1 | 8/2011 | Sorg |
| 2011/0199687 A1 | 8/2011 | Sellier et al. |
| 2011/0248152 A1 | 10/2011 | Svajda et al. |
| 2011/0255000 A1 | 10/2011 | Weber et al. |
| 2011/0255250 A1 | 10/2011 | Dinh |
| 2011/0267833 A1 | 11/2011 | Verrat-Debailleul et al. |
| 2011/0279383 A1 | 11/2011 | Wilson et al. |
| 2011/0300908 A1 | 12/2011 | Grespan et al. |
| 2012/0018323 A1 | 1/2012 | Johnson et al. |
| 2012/0227399 A1 | 2/2012 | Yeates |
| 2012/0099113 A1 | 4/2012 | de Boer et al. |
| 2012/0105400 A1 | 5/2012 | Mathew et al. |
| 2012/0118628 A1 | 5/2012 | Pakula et al. |
| 2012/0135195 A1 | 5/2012 | Glaesemann et al. |
| 2012/0136259 A1 | 5/2012 | Milner et al. |
| 2012/0151760 A1 | 6/2012 | Steijner |
| 2012/0188743 A1 | 7/2012 | Wilson et al. |
| 2012/0196071 A1 | 8/2012 | Cornejo et al. |
| 2012/0202040 A1 | 8/2012 | Barefoot et al. |
| 2012/0236477 A1 | 9/2012 | Weber et al. |
| 2012/0236526 A1 | 9/2012 | Weber et al. |
| 2012/0281381 A1 | 11/2012 | Sanford |
| 2012/0328843 A1 | 12/2012 | Cleary et al. |
| 2013/0071601 A1 | 3/2013 | Bibl et al. |
| 2013/0083506 A1 | 4/2013 | Wright et al. |
| 2013/0182259 A1 | 7/2013 | Brezinski et al. |
| 2013/0213565 A1 | 8/2013 | Lee et al. |
| 2014/0176779 A1 | 6/2014 | Weber et al. |

FOREIGN PATENT DOCUMENTS

| | | |
|---|---|---|
| CN | 1369449 A | 9/2002 |
| CN | 1694589 A | 11/2005 |
| CN | 101025502 | 8/2007 |
| CN | 101206314 | 6/2008 |
| CN | 101523275 | 2/2009 |
| CN | 101465892 | 6/2009 |
| CN | 102131357 | 7/2011 |
| CN | 101267509 | 8/2011 |
| CN | 1322339 A | 11/2011 |
| CN | 202799425 U | 3/2013 |
| DE | 14 96 586 A1 | 6/1969 |
| DE | 17 71 268 A1 | 12/1971 |
| DE | 32 12 612 A1 | 10/1983 |
| DE | 103 22 350 A1 | 12/2004 |
| EP | 1038663 A2 | 9/2000 |
| EP | 1 206 422 B1 | 11/2002 |
| EP | 1 593 658 A1 | 11/2005 |
| EP | 1592073 | 11/2005 |
| EP | 2025556 A2 | 2/2009 |
| EP | 2036867 A1 | 3/2009 |
| EP | 2075237 | 7/2009 |
| EP | 2196870 A1 | 6/2010 |
| EP | 2233447 | 9/2010 |
| EP | 2483216 | 8/2012 |
| EP | 2635540 | 9/2013 |
| FR | 2 797 627 A1 | 2/2001 |
| FR | 2 801 302 A1 | 5/2001 |
| GB | 1071351 | 6/1967 |
| GB | 1 346 747 | 2/1974 |
| JP | B S42-011599 | 6/1963 |
| JP | B-S48-006925 | 3/1973 |
| JP | 55031944 | 3/1980 |
| JP | 55 067529 | 5/1980 |
| JP | 55 067529 A | 5/1980 |
| JP | 55-95645 | 7/1980 |
| JP | A S55-136979 | 10/1980 |
| JP | 55 144450 | 11/1980 |
| JP | A S59-013638 | 1/1984 |
| JP | 59037451 | 2/1984 |
| JP | A S61-097147 | 5/1986 |
| JP | 6066696 | 10/1986 |
| JP | 63 060129 | 3/1988 |
| JP | 63222234 | 9/1988 |
| JP | 5-32431 | 2/1993 |
| JP | 05249422 | 9/1993 |
| JP | 6242260 A | 9/1994 |
| JP | A H07-050144 | 2/1995 |
| JP | 52031757 | 3/1997 |
| JP | A-H09-073072 | 3/1997 |
| JP | A H09-507206 | 7/1997 |
| JP | 09-312245 | 12/1997 |
| JP | A 2000-086261 | 3/2000 |
| JP | 2000-163031 | 6/2000 |
| JP | 200203895 A | 7/2000 |
| JP | A 2001-083887 | 3/2001 |
| JP | A 2002-160932 | 6/2002 |
| JP | 2002-342033 | 11/2002 |
| JP | A 2002-338283 | 11/2002 |
| JP | A 2003502257 | 1/2003 |
| JP | A2003-146705 | 5/2003 |
| JP | A 2004-094256 | 3/2004 |
| JP | A2004-259402 | 9/2004 |
| JP | A2004-339019 | 12/2004 |
| JP | 2005-165249 | 6/2005 |
| JP | 2005140901 | 6/2005 |
| JP | A 2005-156766 | 6/2005 |
| JP | 2007-099557 | 4/2007 |
| JP | 2008-001590 | 1/2008 |
| JP | 2008007360 | 1/2008 |
| JP | 2008-63166 A | 3/2008 |
| JP | 2008-066126 A | 3/2008 |
| JP | 2008-192194 | 8/2008 |
| JP | A 2008-195602 | 8/2008 |
| JP | A 2008-216938 | 9/2008 |
| JP | A 2008-306149 | 12/2008 |
| JP | A 2009-167086 | 7/2009 |
| JP | A 2009-234856 | 10/2009 |

(56) References Cited

FOREIGN PATENT DOCUMENTS

| | | |
|---|---|---|
| JP | A 2009230341 | 10/2009 |
| JP | 2010 064943 | 3/2010 |
| JP | A 2010-060908 | 3/2010 |
| JP | 2010-116276 | 5/2010 |
| JP | 2010/195600 | 9/2010 |
| JP | A 2010-237493 | 10/2010 |
| JP | 2011-032124 | 2/2011 |
| JP | A 2011-032140 | 2/2011 |
| JP | A 2011-158799 | 8/2011 |
| JP | 2011-527661 | 11/2011 |
| JP | A 2011-231009 | 11/2011 |
| JP | A2013-537723 | 10/2013 |
| KR | 2010-2006-005920 | 1/2006 |
| KR | 10-2010-0019526 | 2/2010 |
| KR | 10-2011-0030919 | 3/2011 |
| TW | 201007521 A | 2/2010 |
| TW | 201235744 A1 | 9/2012 |
| WO | WO 00/47529 A | 8/2000 |
| WO | WO 02/42838 A1 | 5/2002 |
| WO | WO 2004/014109 | 2/2004 |
| WO | WO 2004-061806 | 7/2004 |
| WO | WO 2004/106253 A | 12/2004 |
| WO | WO 2007/089054 A1 | 8/2007 |
| WO | WO 2008/044694 A | 4/2008 |
| WO | WO 2008/143999 A1 | 11/2008 |
| WO | WO 2009/003029 | 12/2008 |
| WO | WO 2009/078406 | 6/2009 |
| WO | WO 2009/099615 | 8/2009 |
| WO | WO 2009/102326 | 8/2009 |
| WO | WO 2009125133 A2 | 10/2009 |
| WO | WO 2010/005578 | 1/2010 |
| WO | WO 2010/014163 | 2/2010 |
| WO | WO 2010/019829 A1 | 2/2010 |
| WO | WO 2010/080988 | 7/2010 |
| WO | WO 2010/101961 | 9/2010 |
| WO | WO 2011/008433 | 1/2011 |
| WO | WO2011/041484 | 4/2011 |
| WO | WO 2011/041484 A1 | 4/2011 |
| WO | WO 2012/015960 | 2/2012 |
| WO | WO 2012/106280 | 8/2012 |
| WO | WO 2013/106242 A2 | 7/2013 |

OTHER PUBLICATIONS

Wikipedia: "Iphone 4", www.wikipedia.org, retrieved Oct. 31, 2011, 15 pgs.
"Toward Making Smart Phone Touch-Screens More Glare and Smudge Resistant", e! Science News, http://eciencenews.com/articles/2009/08/19toward.making.smart.phone.touch.screens.more.glare.and.smudge.resistant, Aug. 19, 2009, 1 pg.
Arun K. Varshneya, Chemical Strengthening of Glass: Lessons Learned and Yet to be Learned International Journal of Applied Glass Science, 2010, 1, 2, pp. 131-142.
Aben "Laboratory of Photoelasticity", Institute of Cybernetics at TTU, www.ioc.ee/res/photo.html, Oct. 5, 2000.
Forooghian et al., Investigative Ophthalmology & Visual Science; Oct. 2008, vol. 49, No. 10.
"iPhone 4", Wikipedia, Jan. 4, 2012, 17 pgs.
Mehrl et al., "Designer's Noticebook: Proximity Detection IR LED and Optical Crosstalk", http://ams.com/eng/content/view/download/145137, Aug. 1, 2011, 5 pages.
Ohkuma, "Development of a Manufacturing Process of a Thin, Lightweight LCD Cell", Department of Cell Process Development, IBM, Japan, Section 13.4.
Lee et al., "A Multi-Touch Three Dimensional Touch-Sensitive Tablet", Proceedings of CHI: ACM Conference on Human Factors in Computing Systems, Apr. 1985, pp. 21-25.
Rubin, "The Automatic Recognition of Gestures", CMU-CS-91-202, Submitted in Partial Fulfillment of the Requirements of the Degree of Doctor of Philosophy in Computer Science at Carnegie Mellon University, Dec. 1991, 285 pages.
Rubin, "Combining Gestures and Direct Manipulation", CHI'92, May 1992, pp. 659-660.
Westerman, "Hand Tracking, Finger Identification and Chronic Manipulation of a Multi-Touch Surface", A Dissertation Submitted to the Faculty of the University of Delaware in Partial Fulfillment of the Requirements for the degree of Doctor of Philosophy in Electrical Engineering, Spring 1999, 364 pages.
Karlsson et al., "The Technology of Chemical Glass Strenthening—a revew", Apr. 2010, Glass Technology, European Journal of Glass Science and Technology A., vol. 51, No. 2, pp. 41-54.
International Search Report for International Application No. PCT/US2012/063745, dated Mar. 5, 2013.
Written Opinion for International Application No. PCT/US2012/063745, dated Mar. 5, 2013.
First Office Action for Japanese Patent Application No. 2014-542337, dated Apr. 27, 2015.
First Office Action for Chinese Patent Application No. 201280057090.7, dated Jul. 28, 2015.
Notice of Preliminary Rejection for Korean Patent Application No. 10-2014-7016844, dated Oct. 20, 2015.
Office Action for Japanese Patent Application No. 2014-542337 dated Jan. 29, 2016.

* cited by examiner

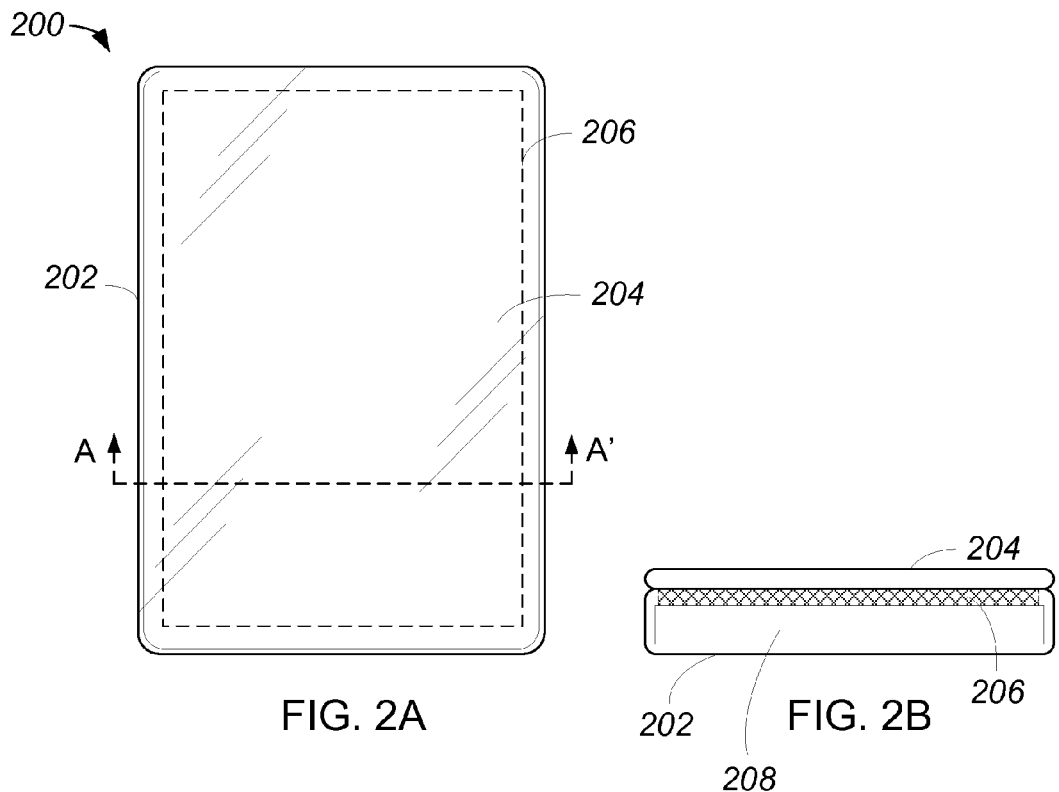
FIG. 2A
FIG. 2B
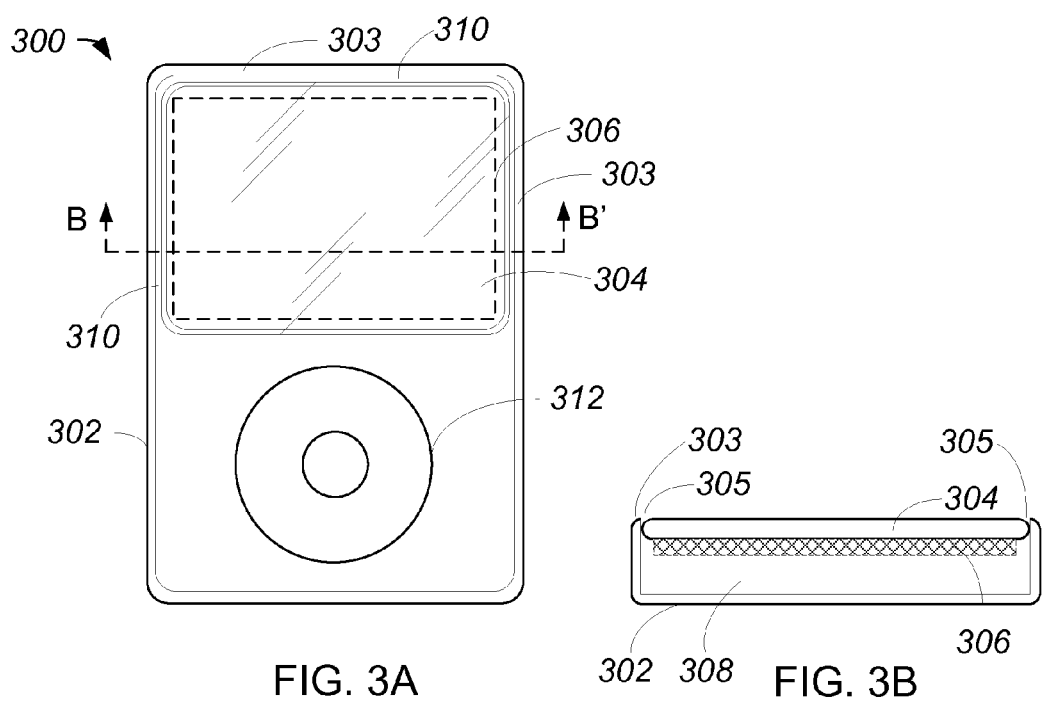
FIG. 3A
FIG. 3B

SELF-OPTIMIZING CHEMICAL STRENGTHENING BATH FOR GLASS

BACKGROUND OF THE INVENTION

Conventionally, some portable electronic devices use glass as a part of their devices, either internal or external. Externally, a glass part can be provided as part of a housing, such a glass part is often referred to as a cover glass. The transparent and scratch-resistance characteristics of glass make it well suited for such applications. Internally, glass parts can be provided to support display technology. More particularly, for supporting a display, a portable electronic device can provide a display technology layer beneath an outer cover glass. A sensing arrangement can also be provided with or adjacent the display technology layer. By way of example, the display technology layer may include or pertain to a Liquid Crystal Display (LCD) that includes a Liquid Crystal Module (LCM). The LCM generally includes an upper glass sheet and a lower glass sheet that sandwich a liquid crystal layer therebetween. The sensing arrangement may be a touch sensing arrangement such as those used to create a touch screen. For example, a capacitive sensing touch screen can include substantially transparent sensing points or nodes dispersed about a sheet of glass.

Unfortunately, however, use of glass with portable electronic devices requires that the glass be relatively thin. Generally speaking, the thinner the glass the more susceptible the glass is to damage when the portable electronic device is stressed or placed under a significant force. There is a continuing need to provide improved ways to strengthen glass, namely, thin glass.

SUMMARY

The invention relates generally to increasing the strength of glass. Glass can be strengthened chemically using monitored ion exchange. Glass members can be disposed in a glass ion exchange bath. As glass members are chemically strengthened in the glass ion exchange bath, exchanged ions can accumulate in the glass ion exchange bath. Accumulated ion exchange between glass members and the glass ion exchange bath can be monitored.

The apparatus, systems and methods for improving strength of thin glass are especially suitable for cover glass or displays (e.g., LCD displays), particularly those assembled in small form factor electronic devices such as handheld electronic devices (e.g., mobile phones, media players, personal digital assistants, remote controls, etc.). The glass can be thin in these small form factor embodiments, such as less than 3 mm, or more particularly between 0.3 and 2.5 mm. The apparatus, systems and methods can also be used for cover glass or displays for other devices including, but not limited to including, relatively larger form factor electronic devices (e.g., portable computers, tablet computers, displays, monitors, televisions, etc.). The glass can also be thin in these larger form factor embodiments, such as less than 5 mm, or more particularly between 0.3 and 3 mm.

The invention can be implemented in numerous ways, including as a method, system, device, or apparatus. Several embodiments of the invention are discussed below.

As a system for producing cover glass for exposed surfaces of consumer electronic products, one embodiment can, for example, include at least a glass ion exchange bath for chemically strengthening cover glass by disposing cover glass in the glass ion exchange bath, and a glass ion exchange monitor for monitoring accumulated ion exchange between cover glass and the glass ion exchange bath.

As a consumer electronic product, one embodiment can, for example, include at least a housing having a front surface; electrical components provided at least partially internal to the housing, the electrical components including at least a processor, a memory, and a display, the display being provided at or adjacent the front surface of the housing; and cover glass provided at or over the front surface of the housing such that it is provided over the display, the cover glass being strengthened chemically using monitored ion exchange.

As a computer readable medium including at least executable computer program code tangibly stored thereon, one embodiment can, for example, include at least: computer program code for receiving a value that is substantially related to an amount of accumulated ion exchange between cover glass and a glass ion exchange bath; computer program code for retrieving a threshold value; and computer program code for comparing the threshold value to the value that is substantially related to the amount of accumulated ion exchange between cover glass and the glass ion exchange bath.

As a method for producing cover glass for exposed surfaces of consumer electronic products, one embodiment can, for example, include at least: obtaining cover glass for the exposed surfaces of consumer electronic products; chemically strengthening cover glass using a glass ion exchange bath; and monitoring ion exchange between cover glass and the glass ion exchange bath.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 2A and 2B are diagrammatic representations of electronic device according to one embodiment.

FIGS. 3A and 3B are a diagrammatic representation of an electronic device according to another embodiment.

DETAILED DESCRIPTION OF EMBODIMENTS OF THE INVENTION

The invention relates generally to increasing the strength of glass. Glass can be strengthened chemically using monitored ion exchange. Glass members can be disposed in a glass ion exchange bath. As glass members are chemically strengthened in the glass ion exchange bath, exchanged ions can accumulate in the glass ion exchange bath. Accumulated ion exchange between glass members and the glass ion exchange bath can be monitored.

Embodiments of the invention can relate to apparatus, systems and methods for improving strength of thin glass members for consumer products, such as consumer electronic devices. In one embodiment, the glass member may be an outer surface of a consumer electronic device. For example, the glass member may, for example, correspond to cover glass that helps form part of a display area of the electronic device (i.e., situated in front of a display either as a separate part or integrated within the display). As another example, the glass member may form a part of a housing for the consumer electronic device (e.g., may form an outer surface other than in the display area). In another embodiment, the glass member may be an inner component of a consumer electronic device. For example, the glass member can be a component glass piece of a LCD display provided internal to the housing of the consumer electronic device.

The apparatus, systems and methods for improving strength of thin glass are especially suitable for cover glass or displays (e.g., LCD displays), particularly those assembled in small form factor electronic devices such as handheld electronic devices (e.g., mobile phones, media players, personal digital assistants, remote controls, etc.). The glass can be thin in these small form factor embodiments, such as less than 3 mm, or more particularly between 0.3 and 2.5 mm. The apparatus, systems and methods can also be used for cover glass or displays for other devices including, but not limited to including, relatively larger form factor electronic devices (e.g., portable computers, tablet computers, displays, monitors, televisions, etc.). The glass can also be thin in these larger form factor embodiments, such as less than 5 mm, or more particularly between 0.3 and 3 mm.

Embodiments of the invention are discussed below with reference to FIGS. 1-9. However, those skilled in the art will readily appreciate that the detailed description given herein with respect to these figures is for explanatory purposes as the invention extends beyond these limited embodiments. The illustrations provided in these figures are not necessarily drawn to scale; instead, the illustrations are presented in a manner to facilitate presentation.

Figure 1:
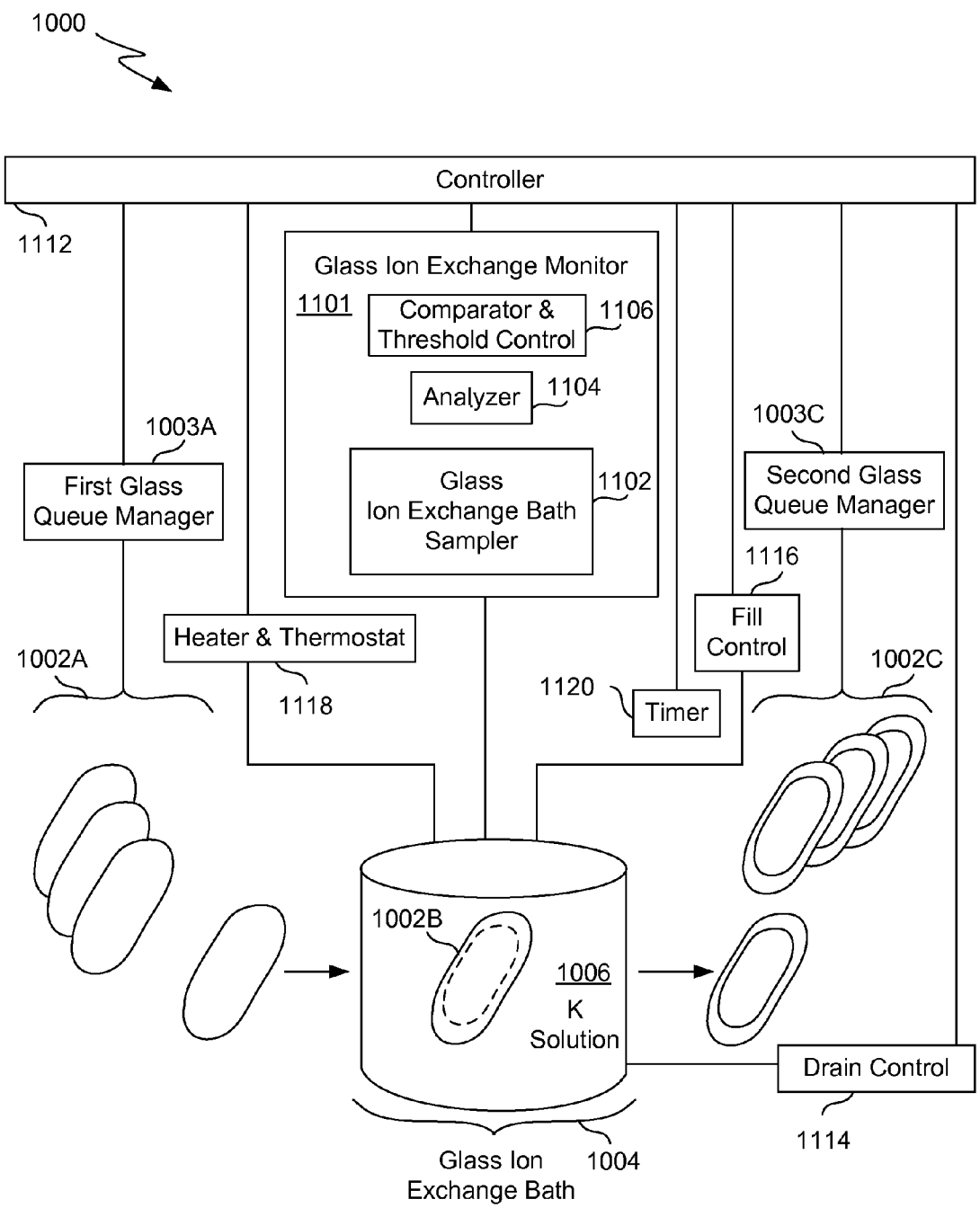
FIG. 1 is a block diagram of a system according to one embodiment.

FIG. 1 is a block diagram of a system 1000 according to one embodiment. System 1000 can produce cover glass for exposed surfaces of consumer electronic products. More particularly, system 1000 can chemically strengthen cover glass.

FIG. 1 shows cover glass 1002A, 1002B, 1002C in cross sectional view in various stages of processing. Cover glass 1002A to be chemically strengthened can be managed by a first queue manager 1003A for organizing and/or tracking cover glass 1002A to be strengthened. Cover glass 1002C that has been chemically strengthened can be managed by a second queue manager 1003C for organizing and/or tracking cover glass that has been chemically strengthened.

In FIG. 1 a first notional arrow extends from the cover glass 1002A to be chemically strengthened, and extends towards the cover glass 1002B being chemically strengthen, so as to show processing progress of system 1000. Cover glass 1002B begins chemically strengthen by being disposed in glass ion exchange bath 1004. Cover glass 1002B can be inserted (e.g., immersed) into glass ion exchange bath 1004. In one embodiment, glass ion exchange bath 1004 can comprise a potassium solution 1006. A notional dashed line highlights a chemically strengthened layer being formed in cover glass 1002B being chemically strengthen while disposed in glass ion exchange bath 1004.

After a period of time, this cover glass 1002B is removed from the glass ion exchange bath 1004. At this point, the cover glass has been chemically strengthened. In FIG. 1, a second notional arrow extends from the cover glass 1002B being chemically strengthened, and extends towards the cover glass 1002C that has been chemically strengthen, so as to show processing progress of system 1000. Lines highlight chemically strengthened layers that have been formed respectively in the cover glass 1002C that has been chemically strengthened.

The degree of chemically strengthening provided by glass ion exchange bath 1004 to cover glass may be dependent on type of glass, and on processing parameters, such as (1) initial concentration of bath (e.g., initial K concentration), (2) accumulated ion exchange between cover glass and the glass ion exchange bath 1004 (3) duration of time cover glass is disposed in glass ion exchange bath 1004, and (4) temperature of glass ion exchange bath 1004. In one implementation, cover glass can, for example, be alumina silicate glass or soda lime glass. For example, cover glass can be immersed in a heated potassium bath at a temperature of about 300-500 degrees Celsius for a predetermined duration of about 6-20 hours. Also, glass from different suppliers, even if the same type of glass, can have different properties and thus may require different processing parameters.

Initial concentration of the glass ion exchange bath 1004 can be high (e.g. for fresh potassium solution, initial K concentration may be high, and may be close to 100%.) Preparation of glass ion exchange bath 1004 can be started by filling an empty glass ion exchange bath with fresh potassium solution. Similarly, after a suitable amount of use of the potassium solution for chemically strengthening cover glass in the glass ion exchange bath, and after accumulating exchanged ions in the potassium solution of the glass ion exchange bath 1004 in excess of some predetermined refresh threshold, a determination can be made that glass ion exchange bath 1004 should be subsequently re-started with fresh potassium solution.

The glass ion exchange bath can be emptied by draining the used potassium solution from the glass ion exchange bath 1004, so that the glass ion exchange bath can refilled with fresh potassium solution. At such time, accumulated ion exchange in the used potassium solution can be drained from the glass ion exchange bath 1004, and replaced with fresh potassium solution can be substantially free of any accumulated ion exchange.

Moreover, it should be understood that glass ion exchange bath 1004 may be partially emptied by partially draining used potassium solution, and may be partially refilled with fresh potassium solution, for reducing accumulated ion exchange in the glass ion exchange bath 1004. For example, after some intermediate amount of use of the potassium solution for chemically strengthening cover glass in the glass ion exchange bath, and after accumulating exchanged ions in the potassium solution of the glass ion exchange bath 1004 in excess of some predetermined partial-refresh threshold, a determination may be made that glass ion exchange bath 1004 should be partially drained (e.g. half-way drained), and partially refilled (e.g. half-way refilled) with fresh potassium solution, so as to reduce substantially accumulated ion exchange (e.g. reduce accumulated ion exchange by approximately one half.)

The fresh potassium solution within glass ion exchange bath 1004 can be heated to a predetermined initial temperature, and initial cover glass can be immersed within glass ion exchange bath 1004 for a predetermined initial duration. A first processing configuration (Configuration 1) may comprise processing parameters such as low accumulated ion exchange (e.g. substantially fresh potassium solution), predetermined initial temperature, and predetermined initial duration. As subsequent cover glass is chemically strengthened in glass ion exchange bath 1004, there may be an increase in accumulated ion exchange in excess of one or more intermediate thresholds, so that one or more processing parameters of the glass ion exchange bath should be changed, based at least in part on the increase in accumulated ion exchange.

For example, the duration of time that cover glass is disposed in glass ion exchange bath 1004 can be increased based at least in part upon predetermined amount of increase in accumulated ion exchange. Further, temperature of glass ion exchange bath 1004 can be decreased based at least in part upon predetermined amount of increase in accumulated ion exchange. Moreover, temperature of glass ion exchange bath 1004 may be decreased along with increased duration of time that cover glass may disposed in glass ion exchange bath 1004.

For example, as subsequent cover glass is chemically strengthened in glass ion exchange bath 1004, there may be an increase in accumulated ion exchange in excess of a first predetermined intermediate threshold (e.g. accumulated ion exchange may increase, so as to be in excess of some first intermediate threshold, on the order of approximately a thousand parts per million), so that one or more processing parameters of the glass ion exchange bath should be changed, based at least in part on the increase in accumulated ion exchange. For example, duration of time that cover glass may be disposed in glass ion exchange bath 1004 may be increased to a first increased duration. Temperature of glass ion exchange bath 1004 may be decreased to a first decreased temperature.

Accordingly, a second processing configuration (Configuration 2) may comprise processing parameters such as a first intermediate accumulated ion exchange level (e.g. accumulated ion exchange on the order of approximately a thousand parts per million), a first predetermined intermediate temperature, and a first predetermined intermediate duration.

Then, as additional subsequent cover glass is chemically strengthened in glass ion exchange bath 1004, there may be an additional increase in accumulated ion exchange in excess of a second intermediate threshold (e.g. accumulated ion exchange may increase additionally, so as to be in excess of some second intermediate threshold, on the order of approximately thousands of parts per million), so that one or more processing parameters of the glass ion exchange bath should be changed again, based at least in part on the additional increase in accumulated ion exchange. For example, duration of time that cover glass may be disposed in glass ion exchange bath 1004 may be further increased to a second increased duration. Temperature of glass ion exchange bath 1004 may be further decreased to a second decreased temperature.

Accordingly, a third processing configuration (Configuration 3) may comprise processing parameters such as a second intermediate accumulated ion exchange (e.g. accumulated ion exchange on the order of approximately thousands of parts per million), a second predetermined intermediate temperature, and a second predetermined intermediate duration.

As discussed above, as cover glass is chemically strengthened in the glass ion exchange bath, exchanged ions can accumulate in the glass ion exchange bath 1004. A glass ion exchange monitor 1101 can monitor accumulated ion exchange between cover glass and the glass ion exchange bath 1004.

In other words, when cover glass is chemically strengthened in the glass ion exchange bath 1004, cover glass ions can be exchanged with ions of glass ion exchange bath 1004. The exchanged ions can accumulate in the glass ion exchange bath 1004. The glass ion exchange monitor 1101 can be adapted for monitoring cover glass ions in the glass ion exchange bath 1004 that are accumulated from ion exchange between cover glass and the glass ion exchange bath 1004.

For example, the glass ion exchange bath 1004 can comprise potassium bath 1006, and more particularly can comprise potassium ions for ion exchange with cover glass sodium ions. When cover glass is chemically strengthened in the glass ion exchange bath 1004, cover glass sodium ions can be exchanged with potassium ions of glass ion exchange bath 1004. The exchanged sodium ions can accumulate in the glass ion exchange bath 1004. The glass ion exchange monitor 1101 can be adapted for monitoring sodium ions in the glass ion exchange bath 1004 that are accumulated from ion exchange between cover glass and the glass ion exchange bath 1004.

The glass ion exchange monitor 1101 may comprise a sampler 1102 for sampling the glass ion exchange bath 1004. In one embodiment, sample cups can be used for sampling the glass ion exchange bath. Radio-Frequency Identification (RFID) tags can be used for organizing and/or tracking samples. For example, RFID tags can be coupled with the sample cups for organizing and/or tracking samples.

The glass ion exchange monitor 1101 can comprise an analyzer 1104 for analyzing accumulated ion exchange between cover glass and the glass ion exchange bath 1004. In one embodiment the glass ion exchange monitor 1101 can comprise an atomic absorption analyzer. In another embodiment, the glass ion exchange monitor 1101 can comprise an x-ray florescence analyzer.

The glass ion exchange monitor 1101 can comprise a comparator 1106 for comparing at least one predetermined threshold signal and a signal that is substantially related to the amount of accumulated ion exchange between cover glass and the glass ion exchange bath 1004. For example, comparator 1106 may be coupled with analyzer 1104 for receiving the signal that is substantially related to the amount of accumulated ion exchange between cover glass and the glass ion exchange bath 1004. Comparator 1106 may include a threshold control for setting a threshold and generating the predetermined threshold signal.

Comparator 1106 can compare at least one predetermined threshold value and a value that is substantially related to the amount of accumulated ion exchange between cover glass and the glass ion exchange bath 1004. For example, comparator 1106 may be coupled with analyzer 1104 for receiving the value that is substantially related to the amount of accumulated ion exchange between cover glass and the glass ion exchange bath 1004. Comparator 1106 may include threshold control for setting the predetermined threshold value. The comparator may retrieve the predetermined threshold value from the threshold control, for comparison with the value that is substantially related to the amount of accumulated ion exchange between cover glass and the glass ion exchange bath 1004.

It should be understood that signals and/or values may be associated with the predetermined refresh threshold, the predetermined partial-refresh threshold, the first intermediate threshold and/or the second intermediate threshold as discussed previously herein. Accordingly, the comparator may compare monitored condition(s) of the ion exchange bath 1004 (e.g., signal or value that is substantially related to the amount of accumulated ion exchange) to any of the foregoing, for determining one or more processing parameter changes that should be made, as discussed previously herein.

System 1000 may further comprise a controller 1112, which may be a computer system. Controller 1112 may comprise a communication interface, processing system, storage system, and user interface. The processing system of controller 1112 may be operatively coupled to a storage system. Storage system of controller 1112 may store software and data.

Controller 1112 may be coupled with the glass ion exchange monitor 1101 for receiving one or more signals that are substantially related to accumulated ion exchange between cover glass and the glass ion exchange bath 1004. Controller 1112 may be coupled with the glass ion exchange bath 1004 for controlling at least one processing parameter of the glass ion exchange bath 1004.

Controller 1112 may be coupled with the glass ion exchange monitor 1101 for receiving a monitor signal that is substantially related to accumulated ion exchange between cover glass and the glass ion exchange bath 1004. The controller 1112 may be adapted for generating an indicator signal when the accumulated ion exchange in the glass ion exchange bath 1004 should be reduced based at least in part on the monitor signal. The controller 1112 is coupled with the glass ion exchange bath 1004 for controlling at least one processing parameter of the glass ion exchange bath 1004 based at least in part on the monitor signal.

Controller 1112 may be programmed or otherwise adapted for changing temperature of the glass ion exchange bath 1004 based at least in part upon accumulated ion exchange between cover glass and the glass ion exchange bath 1004. System 1000 may further comprise a heater 1118 for heating the glass ion exchange bath 1004. Controller 1112 may be coupled with the heater 1118 for setting a temperature of the glass ion exchange bath 1004 based at least in part upon the monitor 1101 signal.

Controller 1112 may be programmed or otherwise adapted for selecting a decreased temperature of the glass ion exchange bath 1004, wherein selecting the decrease temperature is based at least in part upon a predetermined amount of increase in accumulated ion exchange between cover glass and the glass ion exchange bath 1004.

Controller 1112 may be programmed or otherwise adapted for changing duration that cover glass should be disposed in the glass ion exchange bath 1004, based at least in part upon accumulated ion exchange between cover glass and the glass ion exchange bath 1004. System 1000 may further comprise a timer 1120 for timing duration that cover glass should be disposed in the glass ion exchange bath 1004. The controller 1112 may be coupled with the timer 1120 for setting the timer 1120 based at least in part upon the monitor 1101 signal.

Controller 1112 may be programmed or otherwise adapted for selecting an increased duration that cover glass should be disposed in the glass ion exchange bath 1004, wherein selecting the increased duration is based at least in part upon a predetermined amount of increase in accumulated ion exchange between cover glass and the glass ion exchange bath 1004.

It should be understood that controller 1112 may receive and process signals and/or values that may be associated with the predetermined refresh threshold, the predetermined partial-refresh threshold, the first intermediate threshold and/or the second intermediate threshold as discussed previously herein. Accordingly, controller 1112 can process the signal or value that is substantially related to the amount of accumulated ion exchange along with any of the foregoing, for determining one or more processing parameter changes that should be made, as discussed previously herein.

System 1000 may further comprise drain control 1114, which may be coupled with controller 1112, for controlling draining of used potassium solution from the glass ion exchange bath 1004. System 1000 may further comprise fill control 1116, which may be coupled with controller 1112, for controlling filling the glass ion exchange bath 1004 with fresh potassium solution.

For example, after a suitable amount of use of the potassium solution for chemically strengthening cover glass in the glass ion exchange bath, accumulated ion exchange can exceed the predetermined refresh threshold. Based on receiving one or more signals or values related to the predetermined refresh threshold and to accumulated ion exchange, controller 1112 can determine that glass ion exchange bath 1004 should be re-started with fresh potassium solution. Controller 1112 can sequentially operate drain control 1114 and fill control 1116 to re-start glass ion exchange bath 1004 with fresh potassium solution.

Similarly, controller 1112 can operate drain control 1114 for partially draining used potassium solution from glass ion exchange bath 1004. Controller 1112 can operate fill control 1116 for partially filling glass ion exchange bath 1004 with fresh potassium solution, for reducing accumulated ion exchange in the glass ion exchange bath 1004. Based on receiving one or more signals or values related to the predetermined partial refresh threshold and to accumulated ion exchange, controller 1112 can determine that glass ion exchange bath 1004 should be partially refreshed. Controller 1112 can sequentially operate drain control 1114 and fill control 1116 to partially refresh glass ion exchange bath 1004.

For example, based on receiving one or more signals or values related to the predetermined partial refresh threshold and to accumulated ion exchange, controller 1112 can determine that glass ion exchange bath 1004 should be partially drained (e.g. half-way drained), and partially refilled (e.g. half-way refilled) with fresh potassium solution, so as to reduce substantially accumulated ion exchange (e.g. reduce accumulated ion exchange by approximately one half.)

FIGS. 2A and 2B are diagrammatic representations of electronic device 200 according to one embodiment. FIG. 2A illustrates a top view for the electronic device 200, and FIG. 2B illustrates a cross-sectional side view for electronic device 200 with respect to reference line A-A'. Electronic device 200 can include housing 202 that has cover glass window 204 (cover glass) as a top surface. Cover glass window 204 is primarily transparent so that display assembly 206 is visible through cover glass window 204. Cover glass window 204 can be strengthened chemically using monitored ion exchange as described herein.

Display assembly 206 can, for example, be positioned adjacent cover glass window 204. Housing 202 can also contain internal electrical components besides the display assembly, such as a device processor, memory, communications circuitry, etc. Display assembly 206 can, for example, include a LCD module. By way of example, display assembly 206 may include a Liquid Crystal Display (LCD) that includes a Liquid Crystal Module (LCM). In one embodiment, cover glass window 204 can be integrally formed with the LCM. Housing 202 can also include an opening 208 for containing the internal electrical components to provide electronic device 200 with electronic capabilities. In one embodiment, housing 202 need not include a bezel for cover glass window 204. Instead, cover glass window 204 can extend across the top surface of housing 202 such that the edges of cover glass window 204 can be aligned (or substantially aligned) with the sides of housing 202. The edges of cover glass window 204 can remain exposed. Although the edges of cover glass window 204 can be exposed as shown in FIGS. 2A and 2B, in alternative embodiment, the edges can be further protected. As one example, the edges of cover glass window 204 can be recessed (horizontally or vertically) from the outer sides of housing 202. As another example, the edges of cover glass window 204 can be protected by additional material placed around or adjacent the edges of cover glass window 204.

Cover glass window 204 may generally be arranged or embodied in a variety of ways. By way of example, cover glass window 204 may be configured as a protective glass piece that is positioned over an underlying display (e.g., display assembly 206) such as a flat panel display (e.g., LCD) or touch screen display (e.g., LCD and a touch layer). Alternatively, cover glass window 204 may effectively be integrated with a display, i.e., glass window may be formed as at least a portion of a display. Additionally, cover glass window 204 may be substantially integrated with a touch sensing device such as a touch layer associated with a touch screen. In some cases, cover glass window 204 can serve as the outer most layer of the display.

FIGS. 3A and 3B are diagrammatic representations of electronic device 300 according to another embodiment. FIG. 3A illustrates a top view for electronic device 300, and FIG. 3B illustrates a cross-sectional side view for electronic device 300 with respect to reference line B-B'. Electronic device 300 can include housing 302 that has cover glass window 304 (cover glass) as a top surface. Cover glass window 304 can be strengthened chemically using monitored ion exchange as described herein.

In the embodiment shown in FIGS. 3A and 3B, cover glass window 304 can be protected by side surfaces 303 of housing 302. Here, cover glass window 304 does not fully extend across the top surface of housing 302; however, the top surface of side surfaces 303 can be adjacent to and aligned vertically with the outer surface of cover glass window 304. Since the edges of cover glass window 304 can be rounded for enhanced strength, there may be gaps 305 that are present between side surfaces 303 and the peripheral edges of cover glass window 304. Gaps 305 are typically very small given that the thickness of cover glass window 304 is thin (e.g., less than 3 mm). However, if desired, gaps 305 can be filled by a material. The material can be plastic, rubber, metal, etc. The material can conform in gap 305 to render the entire front surface of electronic device 300 flush, even across gaps 305 proximate the peripheral edges of cover glass window 304. The material filling gaps 305 can be compliant. The material placed in gaps 305 can implement a gasket. By filling the gaps 305, otherwise probably undesired gaps in the housing 302 can be filled or sealed to prevent contamination (e.g., dirt, water) forming in the gaps 305. Although side surfaces 303 can be integral with housing 302, side surface 303 could alternatively be separate from housing 302 and, for example, operate as a bezel for cover glass window 304.

Cover glass window 304 is primarily transparent so that display assembly 306 is visible through cover glass window 304. Display assembly 306 can, for example, be positioned adjacent cover glass window 304. Housing 302 can also contain internal electrical components besides the display assembly, such as a controller (processor), memory, communications circuitry, etc. Display assembly 306 can, for example, include a LCD module. By way of example, display assembly 306 may include a Liquid Crystal Display (LCD) that includes a Liquid Crystal Module (LCM). In one embodiment, cover glass window 304 is integrally formed with the LCM. Housing 302 can also include an opening 308 for containing the internal electrical components to provide electronic device 300 with electronic capabilities.

The front surface of electronic device 300 can also include user interface control 312. In this embodiment, cover glass window 304 does not cover the entire front surface of electronic device 300. Electronic device 300 essentially includes a partial display area that covers a portion of the front surface.

Cover glass window 304 may generally be arranged or embodied in a variety of ways. By way of example, cover glass window 304 may be configured as a protective glass piece that is positioned over an underlying display (e.g., display assembly 306) such as a flat panel display (e.g., LCD) or touch screen display (e.g., LCD and a touch layer). Alternatively, cover glass window 304 may effectively be integrated with a display, i.e., glass window may be formed as at least a portion of a display. Additionally, cover glass window 304 may be substantially integrated with a touch sensing device such as a touch layer associated with a touch screen. In some cases, cover glass window 304 can serve as the outer most layer of the display.

As noted above, the electronic device can be a handheld electronic device or a portable electronic device. Chemical strengthening can serve to enable cover glass to be not only thin but also adequately strong. Since handheld electronic devices and portable electronic devices are mobile, they are potentially subjected to various different impact events and stresses that stationary devices are not subjected to. As such, the invention is well suited for implementation of glass surfaces for handheld electronic device or a portable electronic device that are designed to be thin.

The strengthened glass, e.g., cover glass or cover glass windows, is particularly useful for thin glass applications. For example, the thickness of a cover glass being strengthen can be between about 0.5-2.5 mm. In other embodiments, the strengthening is suitable for glass products whose thickness is less than about 2 mm, or even thinner than about 1 mm, or still even thinner than about 0.6 mm.

Chemically strengthening glass, e.g., cover glass or cover glass windows, can be more effective for edges of glass that are rounded by a predetermined edge geometry having a predetermined curvature (or edge radius) of at least 10% of the thickness applied to the corners of the edges of the glass. In other embodiments, the predetermined curvature can be between 20% to 50% of the thickness of the glass. A predetermined curvature of 50% can also be considered a continuous curvature, one example of which is illustrated in FIG. 3B.

In one embodiment, the size of the cover glass depends on the size of the associated electronic device. For example, with handheld electronic devices, the size of the cover glass is often not more than five (5) inches (about 12.7 cm) diagonal. As another example, for portable electronic devices, such as smaller portable computers or tablet computers, the size of the cover glass is often between four (4) (about 10.2 cm) to twelve (12) inches (about 30.5 cm) diagonal. As still another example, for portable electronic devices, such as full size portable computers, displays (including televisions) or monitors, the size of the cover glass is often between ten (10) (about 25.4 cm) to twenty (20) inches (about 50.8 cm) diagonal or even larger.

However, it should be appreciated that with larger screen sizes, the thickness of the glass layers may need to be greater. The thickness of the glass layers may need to be increased to maintain planarity of the larger glass layers. While the displays can still remain relatively thin, the minimum thickness can increase with increasing screen size. For example, the minimum thickness of the cover glass can correspond to about 0.3 mm for small handheld electronic devices, about 0.5 mm for smaller portable computers or tablet computers, about 1.0 mm or more for full size portable computers, displays or monitors, again depending on the size of the screen. However, more generally, the thickness of the cover glass can depend on the application and/or the size of electronic device.

As discussed previously herein, cover glass or, more generally, a glass piece may be chemically treated such that surfaces of the glass are effectively strengthened. Through such strengthening, glass pieces can be made stronger so that thinner glass pieces can be used with consumer electronic device. Thinner glass with sufficient strength allows for consumer electronic device to become thinner.

Figure 4A:
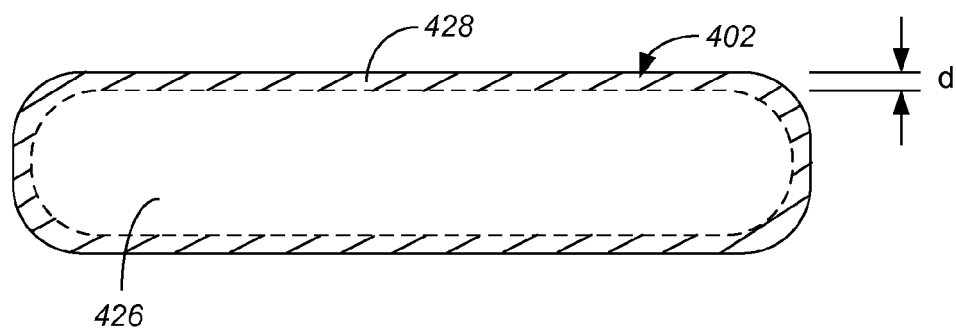
FIG. 4A is a cross-sectional diagram of cover glass which has been chemically treated according to one embodiment.

Cover glass which has undergone a chemical strengthening process generally includes a chemically strengthened layer, as previously mentioned. FIG. 4A is a cross-sectional diagram of cover glass which has been chemically treated such that a chemically strengthened layer is created according to one embodiment. Cover glass 402 includes a chemically strengthened layer 428 and a non-chemically strengthened portion 426. Although the cover glass 402 is, in one embodiment, subjected to chemical strengthening as a whole, the outer surfaces receive the strengthening. The effect of the strengthening is that the non-chemically strengthened portion 426 is in tension, while the chemically strengthened layer 428 is in compression. In light of such compression, chemically strengthened layer may comprise compressive surface layer 428. Compressive surface layer 428 may have a depth of layer (d) which may vary depending upon the requirements of a particular system in which cover glass 402 is to be utilized.

Figure 4B:
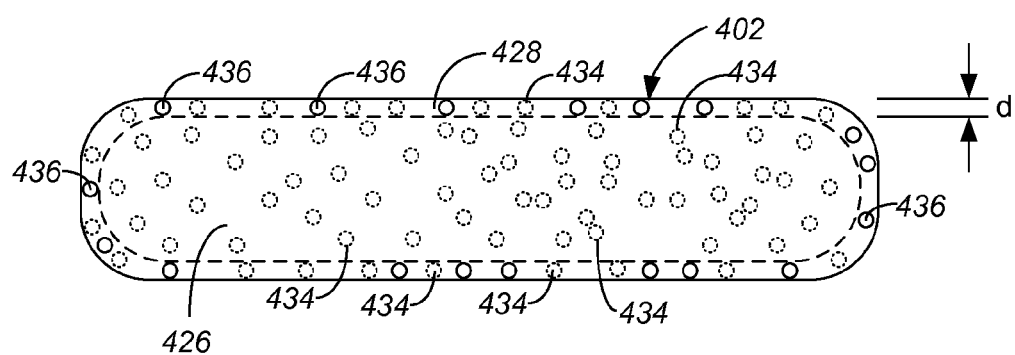
FIG. 4B is a cross-sectional diagram of cover glass which has been chemically treated, as shown to include a chemically treated portion in which potassium ions have been implanted according to one embodiment.

FIG. 4B is a cross-sectional diagram of cover glass 402 which has been chemically treated, as shown to include a chemically treated portion in which Alkali metal ions, e.g. potassium ions, have been implanted from the glass ion exchange bath according to one embodiment. Compressive surface layer 428 may have depth of layer (d). Non-chemically strengthened portion 426 generally includes Na$^+$ ions 434 but no Alkali metal ions 436 from the glass ion exchange bath. A chemical strengthening process causes chemically strengthened layer 428 to be formed such that chemically strengthened layer 428 includes both Alkali metal ions 436 from the glass ion exchange bath and Na$^+$ ions 434.

Figure 5:
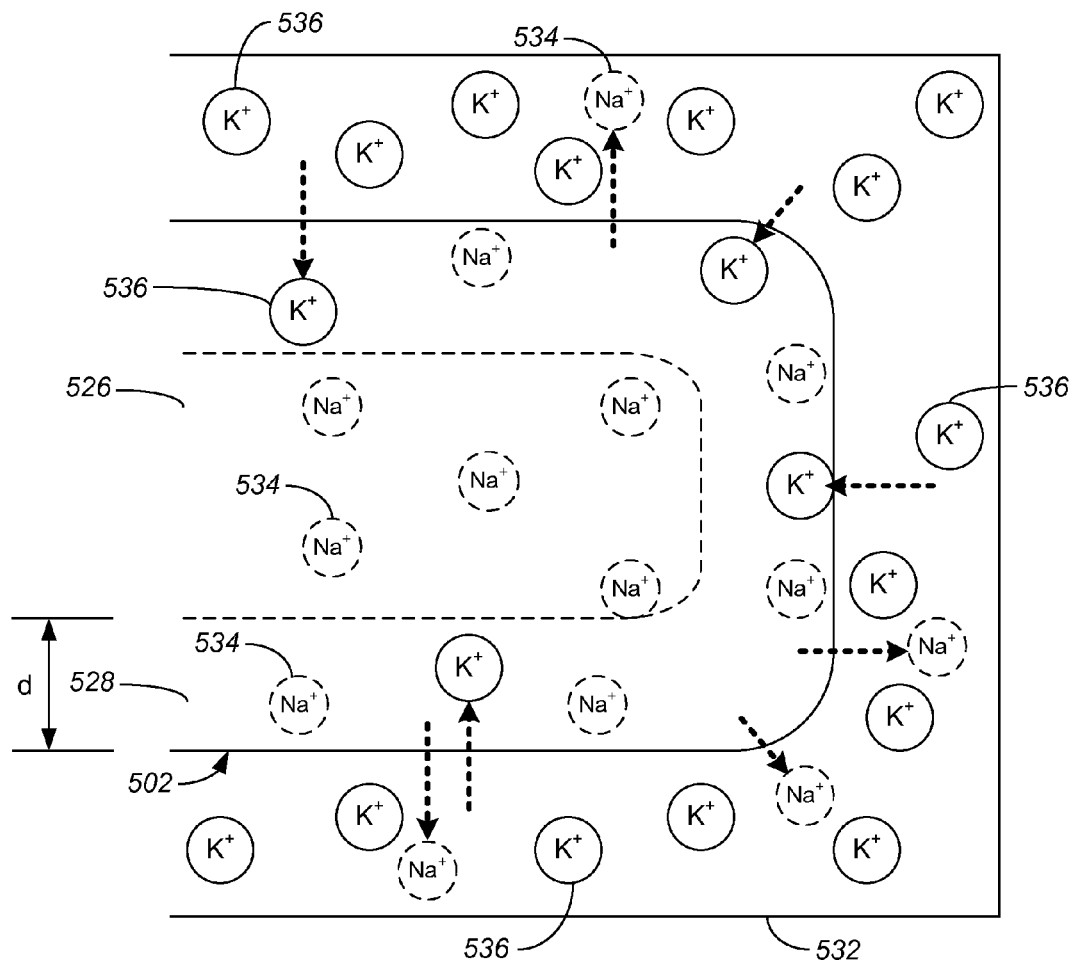
FIG. 5 is a diagrammatic representation of a chemical treatment process that involves submerging cover glass in a glass ion exchange bath according to one embodiment.

FIG. 5 is a diagrammatic representation of a chemical treatment process that involves submerging cover glass 502 in glass ion exchange bath 532 according to one embodiment. When cover glass 502, which is partially shown in cross-section, is submerged or soaked in glass ion exchange bath 532, diffusion occurs. As shown, Alkali metal ions 534 which are present in cover glass 502 diffuse into the glass ion exchange bath 532 while Alkali metal ions 536 (e.g., potassium (K)) in the glass ion exchange bath 532 diffuse into cover glass 502, such that a chemically strengthened layer 528 is formed. In other words, Alkali metal ions 536 from the glass ion exchange bath 532 can be exchanged with Na$^+$ ions 534 to form chemically strengthened layer 528. Alkali metal ions 536 from the glass ion exchange bath 532 typically would not diffuse into a center portion 526 of cover glass 502. By controlling the duration (i.e., time) of a chemical strengthening treatment, temperature and/or the concentration of Alkali metal ions 536 in glass ion exchange bath 532, the layer depth (d) of chemically strengthened layer 528 may be substantially controlled.

The concentration of Alkali metal ions in the glass ion exchange bath may be varied for soaking cover glass in the glass ion exchange bath. In other words, the concentration of Alkali metal ions in the glass ion exchange bath may be maintained substantially constant, may be increased, and/or may be decreased for cover glass submerged in the glass ion exchange bath without departing from the spirit or the scope of the present invention. For example, as Alkali metal ions displace Na$^+$ ions in the glass, the Na$^+$ ions become part of the glass ion exchange bath. Hence, the concentration of Alkali metal ions in the glass ion exchange bath may change unless additional Alkali metal ions are added into the glass ion exchange bath.

Figure 6:
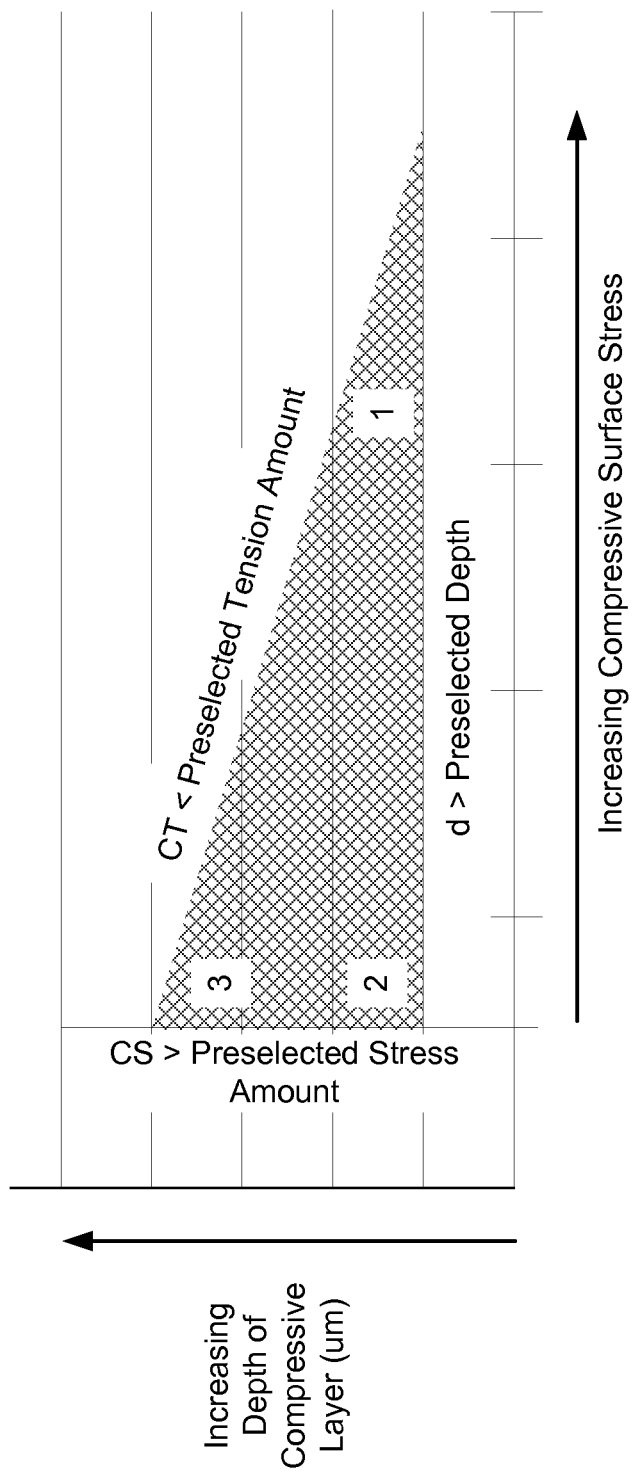
FIG. 6 is a diagram of compressive surface stress versus compressive surface layer depth, which shows a triangular continuum of intersecting ranges for central tension, compressive surface stress and compressive surface layer depth for chemically strengthened cover glass.

FIG. 6 is a diagram of compressive surface stress versus compressive surface layer depth, which shows a desired triangular continuum of intersecting ranges for central tension, compressive surface stress and compressive surface layer depth for chemically strengthened cover glass. The cover glass may be chemically strengthened for a sufficient period of time, so that the compressive surface layer depth of the cover glass may be substantially greater than a preselected compressive surface layer depth.

For example, as shown in FIG. 6, the cover glass may be chemically strengthened for a sufficient period of time, so that the compressive surface layer depth (d) of the cover glass may be substantially greater than a preselected compressive surface layer depth. This is illustrated in the diagram of FIG. 6 with a horizontal legend "d>Preselected Depth", which is disposed along a horizontal extent of the triangular continuum. For example, compressive surface layer depth may be preselected to be greater than approximately ten microns.

Employing a preselected stress amount, the compressive surface stress (CS) shown in FIG. 6 may be substantially greater than a preselected stress amount. This is illustrated in the diagram of FIG. 6 with a vertical legend "CS>Preselected Stress Amount", which is disposed along a vertical extent of the triangular continuum.

Employing a preselected tension amount, central tension (CT) shown in FIG. 6 may be substantially less than the preselected tension amount. In the cover glass, central tension (CT) may be linearly related to the compressive surface stress (CS). The foregoing is illustrated in the diagram of FIG. 6 with a legend "CT<Preselected Tension Amount", which is disposed along a hypotenuse extent of the triangular continuum.

In FIG. 6 hatching is used to highlight the desired triangular continuum of intersecting ranges for central tension, compressive surface stress and compressive surface layer depth for the cover glass. Processing parameters of the glass ion exchange bath may be controlled so that cover glass strengthened in the bath may have central tension, compressive surface stress and compressive surface layer depth within the desired triangular continuum of intersecting ranges shown in FIG. 6.

As discussed previously herein, the first processing configuration (Configuration 1) may comprise processing parameters such as low accumulated ion exchange (e.g. substantially fresh potassium solution), predetermined initial temperature, and predetermined initial duration. The second processing configuration (Configuration 2) may comprise processing parameters such as the first intermediate accumulated ion exchange level (e.g. accumulated ion exchange on the order of approximately a thousand parts per million), the first predetermined intermediate temperature, and the first predetermined intermediate duration. The third processing configuration (Configuration 3) may comprise processing parameters such as the second intermediate accumulated ion exchange (e.g. accumulated ion exchange on the order of approximately thousands of parts per million), the second predetermined intermediate temperature, and the second predetermined intermediate duration.

For processing parameters of each of Configuration 1, Configuration 2 and Configuration 3 as discussed above, the processing parameters of the glass ion exchange bath may be controlled so that cover glass strengthened in the bath may have central tension, compressive surface stress and compressive surface layer depth within the desired triangular continuum of intersecting ranges shown in FIG. 6. In FIG. 6, central tension, compressive surface stress and compressive surface layer depth for cover glass strengthened using Configuration 1 is represented by the legend "1", and is arranged within a high compressive surface stress region of the desired triangular continuum. In FIG. 6, central tension, compressive surface stress and compressive surface layer depth for cover glass strengthened using Configurations 2 and 3 are represented by legends "2" and "3", and are arranged within relatively lower compressive surface stress regions of the desired triangular continuum.

Accordingly, from FIG. 6 it should be understood that cover glass strengthened using processing parameters of Configurations 1, 2 or 3 can each have respective compressive surface layer depth that may be substantially greater than the preselected compressive surface layer depth. Additionally, cover glass strengthened using processing parameters of Configurations 1, 2 or 3 can each have respective compressive surface stress (CS) that may be substantially greater than the preselected compressive amount. Moreover, cover glass strengthened using processing parameters of Configurations 1, 2 or 3 can each have respective central tension (CT) that may be substantially less than the preselected tension amount.

Figure 7A:
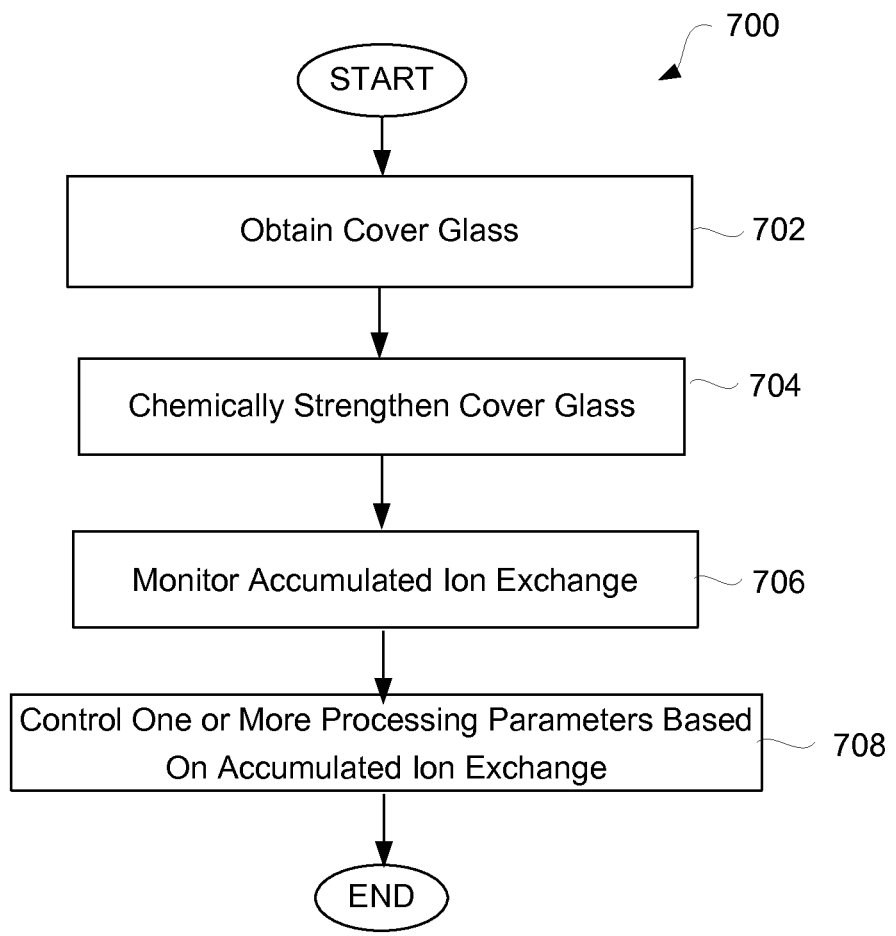
FIG. 7A is a flow diagram of a monitored chemical strengthening process according to one embodiment.

FIG. 7A is a flow diagram of a monitored chemical strengthening process 700 according to one embodiment. The process 700 can serve to produce strengthened cover glass for exposed surfaces of consumer electronic products. The process 700 can begin with obtaining 702 cover glass for the exposed surfaces of consumer electronic products. The cover glass may be obtained, in one embodiment, after a glass sheet is singulated into glass pieces, e.g., cover glass, and the edges of the cover glass are manipulated to have a predetermined geometry. It should be appreciated, however, that a cover glass that is to be chemically treated may be obtained from any suitable source.

The process can continue with chemically strengthening 704 cover glass using a glass ion exchange bath. Chemically strengthening 704 cover glass may comprise creating a compressive layer (e.g., with a depth of at least ten microns).

The chemically strengthening 704 cover glass may, in one embodiment, comprise using potassium ions for ion exchange with cover glass sodium ions. A diffusion exchange occurs between the cover glass, which generally includes $Na^+$ ions, and the glass ion exchange bath. During the diffusion exchange, Alkali metal ions (e.g. Potassium ions), which are larger than $Na^+$ ions, effectively replace the $Na^+$ ions in the cover glass. In general, the $Na^+$ ions near surface areas of the cover glass may be replaced by the Alkali ions, while $Na^+$ ions are essentially not replaced by Alkali ions in portions of the glass which are not surface areas. As a result of the Alkali ions replacing $Na^+$ ions in the cover glass, a compressive layer is effectively generated near the surface of the cover glass. The $Na^+$ ions which have been displaced from the cover glass by the Alkali metal ions become a part of the ion solution of the glass ion exchange bath.

The process 700 can further comprise monitoring 706 accumulated ion exchange between cover glass and the glass ion exchange bath. Monitoring 706 accumulated ion exchange may comprise monitoring accumulated sodium ions from ion exchange between cover glass and the glass ion exchange bath.

Monitoring 706 may comprise sampling the glass ion exchange bath. Monitoring 706 may comprise analyzing accumulated ion exchange between cover glass and the glass ion exchange bath. Monitoring 706 may comprise comparing at least one predetermined threshold to accumulated ion exchange between cover glass and the glass ion exchange bath.

The process 700 may further comprise controlling 708 at least one processing parameter of the glass ion exchange bath based at least in part on the monitoring. For example, accumulated ion exchange in the glass ion exchange bath may be reduced based at least in part on the monitoring.

Temperature of the glass ion exchange bath may be controlled based at least in part on the monitoring. In particular, a decreased temperature of the glass ion exchange bath may be selected based at least in part upon a predetermined amount of increase in accumulated ion exchange between cover glass and the glass ion exchange bath.

Duration of disposing cover glass in the glass ion exchange bath may be controlled based at least in part on the monitoring. In particular, increased duration that cover glass should be disposed in the glass ion exchange bath may be selected based at least in part upon a predetermined amount of increase in accumulated ion exchange between cover glass and the glass ion exchange bath. Following the block 708, process 700 can end.

Figure 7B:
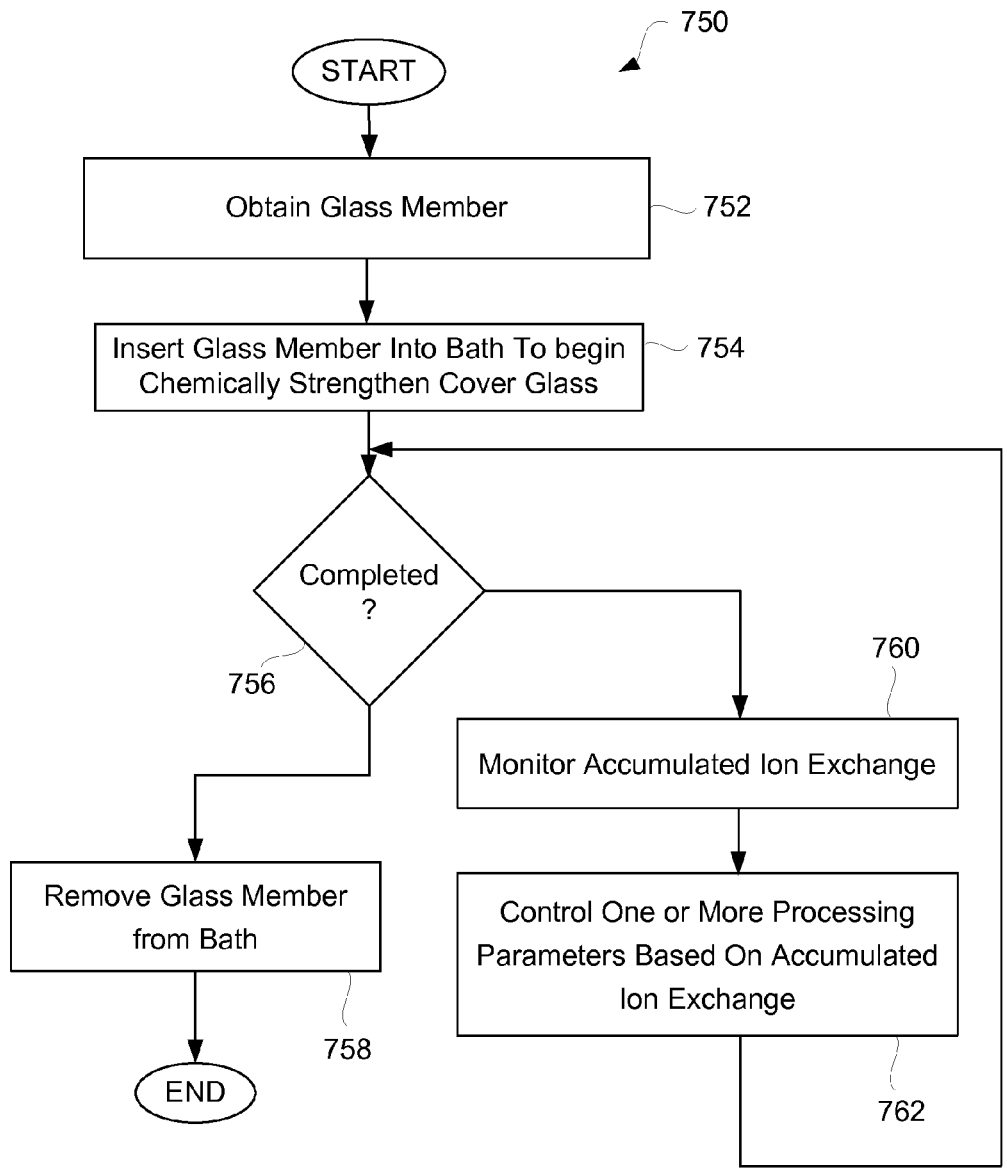
FIG. 7B is a flow diagram of a monitored chemical strengthening process according to another embodiment.

FIG. 7B is a flow diagram of a monitored chemical strengthening process 750 according to another embodiment. The process 750 can serve to produce strengthened glass member for an inner component or an outer component of consumer electronic products. The process 750 can begin with obtaining 752 a glass member. The glass member may be obtained, in one embodiment, after a glass sheet is singulated into glass pieces, e.g., glass members. The glass member can also have some or all of its edges manipulated to have a predetermined geometry. It should be appreciated, however, that a glass member that is to be chemically treated may be obtained from any suitable source. As an example, the glass member can pertain to a cover glass.

The process can continue with inserting 754 the glass member into a bath (ion-exchange bath) to begin chemical chemically strengthening of the glass member. Chemically strengthening the glass member may comprise creating a compressive layer (e.g., with a depth of at least ten microns).

The chemically strengthening of the glass member may, in one embodiment, comprise using potassium ions for ion exchange with sodium ions of the glass member. A diffusion exchange occurs between the glass member, which can include $Na^+$ ions, and the ion exchange bath. During the diffusion exchange, Alkali metal ions (e.g. Potassium ions) provided within the ion exchange bath, which are larger than $Na^+$ ions, can effectively replace the $Na^+$ ions in the glass member. In general, the $Na^+$ ions near surface areas of the glass member may be replaced by the Alkali ions, while $Na^+$ ions are essentially not replaced by Alkali ions in portions of the glass which are not surface areas. As a result of the Alkali ions replacing $Na^+$ ions in the glass member, a compressive layer is effectively generated near the surface of the glass member. The $Na^+$ ions which have been displaced from the glass member by the Alkali metal ions become a part of the ion solution of the ion exchange bath.

Next, a decision 756, can determine whether the chemical strengthening of the glass member is completed. If the chemical strengthening is completed, such as after being resident in the ion exchange bath for a predetermined duration, then the process 750 can remove 758 the strengthened glass member from the ion exchange bath. Following the removal 758 of the glass member from the ion exchange bath, the process 750 can end.

Alternatively, if the chemical strengthening is not complete, then the process 750 can monitor 760 ion exchange between the glass member and the ion exchange bath. For example, in one embodiment, the monitoring 760 can monitor accumulated ion exchange, such as accumulated sodium ions in the ion exchange bath. In one embodiment, the monitoring 760 of the ion exchange can comprise sampling the glass ion exchange bath and analyzing accumulated ion exchange between glass member and the ion exchange bath. For example, the monitoring 760 may comprise comparing at least one predetermined threshold to accumulated ions in the ion exchange bath.

The process 750 may further comprise controlling 762 of at least one processing parameter of the ion exchange bath based at least in part on the monitoring 760. For example, accumulated ions in the ion exchange bath may be removed or reduced based at least in part on the monitoring 760. As another example, temperature of the ion exchange bath may be controlled based at least in part on the monitoring 760. In particular, a decreased temperature of the ion exchange bath may be selected based at least in part upon a predetermined amount of increase in accumulated ion exchange between cover glass and the glass ion exchange bath. Still another example, duration of disposing glass members in the ion exchange bath may be controlled based at least in part on the monitoring 760. In particular, increased duration that glass member should be disposed in the ion exchange bath may be selected based at least in part upon a predetermined amount of increase in accumulated ions in the ion exchange bath. Following the block 762, process 750 can return to repeat the decision 756 so that monitoring can continue (continuously, periodically or as requested).

Typically, the longer the duration of disposing cover glass in the glass ion exchange bath, i.e., the higher the exchange time for Alkali metal ions and $Na^+$ ions, the deeper the depth of the chemically strengthened layer. For example, with thickness of the cover glass being on the order of 1 mm, the chemical processing (i.e., ion exchange) provided in the glass ion exchange bath can be provide into the surfaces of the cover glass for a depth of 10 micrometers or more. For example, for cover glass formed from soda lime glass, the depth of the compression layer due to the ion exchange can be about 10 microns or more. As another example, for cover glass formed from alumino silicate glass, the depth of the compression layer due to the ion exchange can be about 50 microns or more.

The techniques describe herein may be applied to glass surfaces used by any of a variety of electronic devices including but not limited handheld electronic devices, portable electronic devices and substantially stationary electronic devices. Examples of these include any known consumer electronic device that includes a display. By way of example, and not by way of limitation, the electronic device may correspond to media players, mobile phones (e.g., cellular phones), PDAs, remote controls, notebooks, tablet PCs, monitors, all in one computers and the like.

Figure 8:
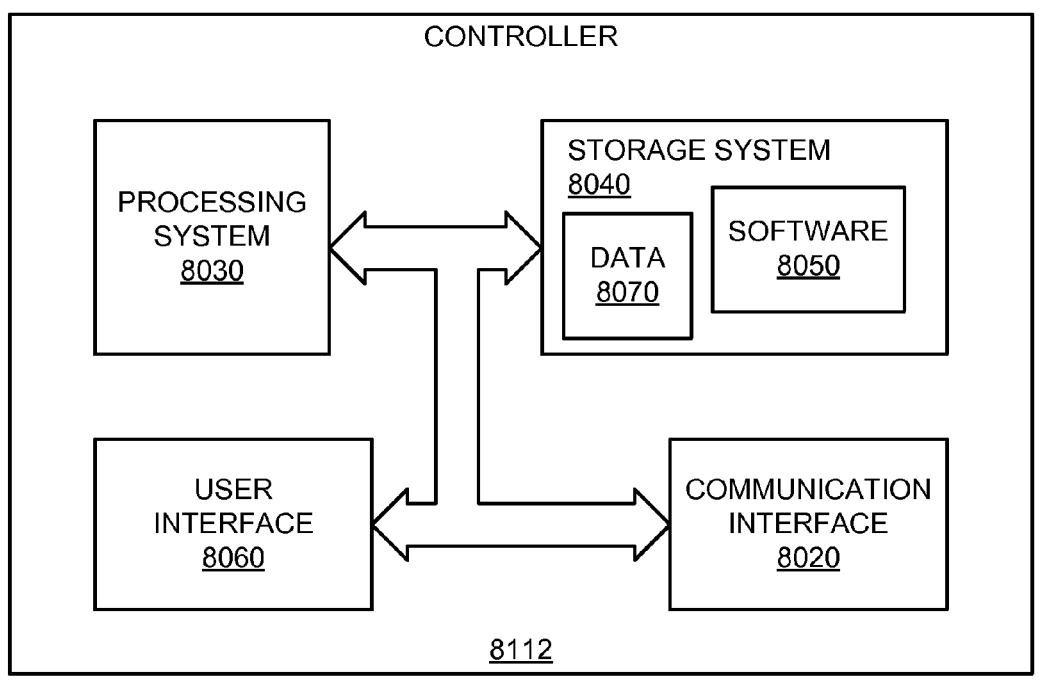
FIG. 8 is a block diagram of a controller according to one embodiment.

FIG. 8 is a block diagram of a controller 8112 according to one embodiment. The controller can pertain to at least a portion of an electronic device. Controller 8112 can includes communication interface 8020, processing system 8030, storage system 8040, and user interface 8060. Processing system 8030 can be operatively coupled to storage system 8040. Storage system 8040 can store software 8050 and data 8070.

Figure 9:
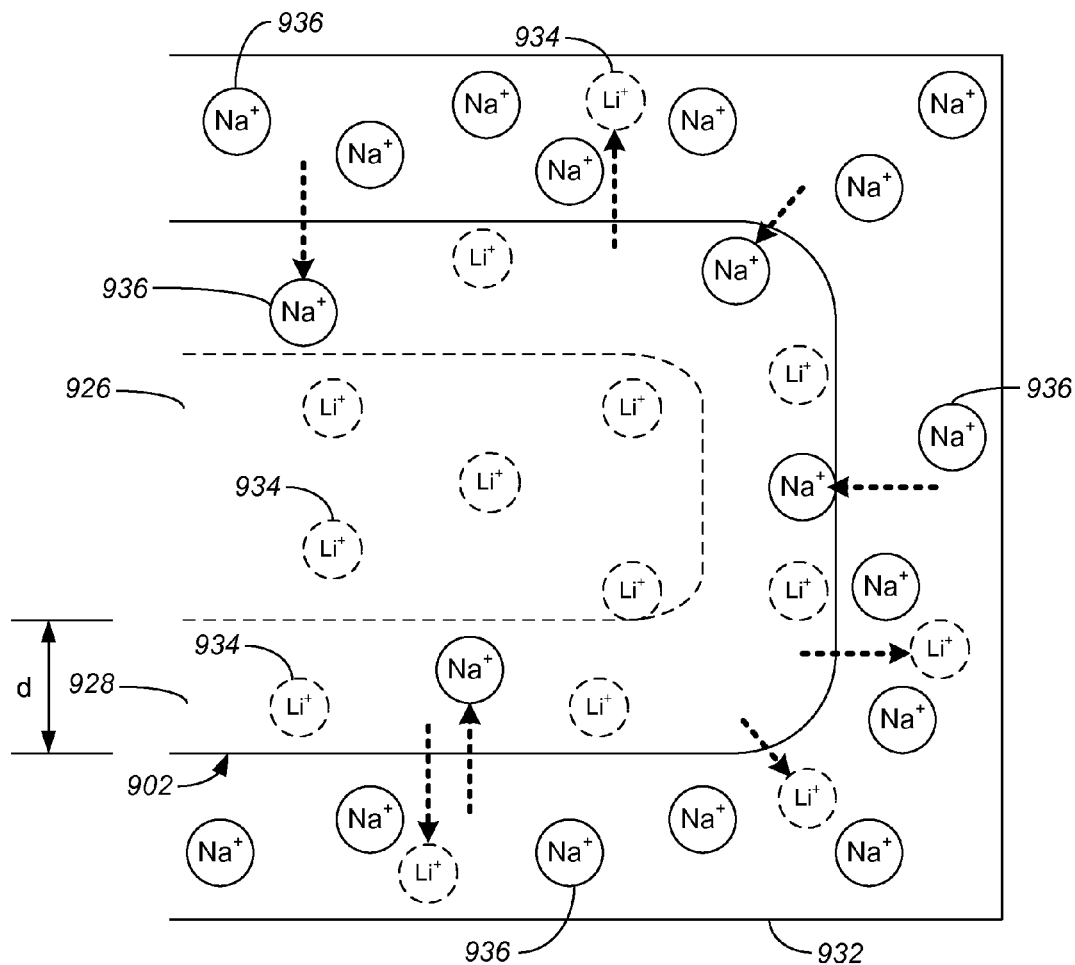
FIG. 9 is a diagrammatic representation of a chemical treatment process that involves submerging cover glass in a glass ion exchange bath according to another embodiment.

FIG. 9 is a diagrammatic representation of a chemical treatment process that involves submerging cover glass 902 in glass ion exchange bath 932 according to another embodiment. Previously herein, specific examples of exchanging potassium ions of the bath with sodium ions of the cover glass. However, different ion exchanges may be used in other embodiments. In other embodiments, other schemes for chemically strengthening glass can be used. For example, in another embodiment shown in FIG. 9, sodium ions 936 of the bath may be exchanged with lithium ions 934 of the cover glass. In such case, the glass ion exchange monitor can be adapted for monitoring/analyzing lithium ions in glass ion exchange bath 932 that are accumulated from ion exchange between cover glass 902 and the glass ion exchange bath 932.

Accordingly, when cover glass 902, which is partially shown in cross-section, is submerged or soaked in glass ion exchange bath 932, diffusion occurs. As shown, Alkali metal ions 934 which are present in cover glass 902 diffuse into the glass ion exchange bath 932 while Alkali metal ions 936 (e.g., Sodium (Na)) in the glass ion exchange bath 932 diffuse into cover glass 902, such that a chemically strengthened layer 928 is formed. In other words, Alkali metal ions 936 from the glass ion exchange bath 932 can be exchanged with $Li^+$ ions 934 to form chemically strengthened layer 928. Alkali metal ions 936 from the glass ion exchange bath 932 typically would not diffuse into a center portion 926 of cover glass 902. By controlling the duration (i.e., time) of a chemical strengthening treatment, temperature and/or the concentration of Alkali metal ions 936 in glass ion exchange bath 932, the layer depth (d) of chemically strengthened layer 928 may be substantially controlled.

The concentration of Alkali metal ions in the glass ion exchange bath may be varied for soaking cover glass in the glass ion exchange bath. In other words, the concentration of Alkali metal ions in the glass ion exchange bath may be maintained substantially constant, may be increased, and/or may be decreased for cover glass submerged in the glass ion exchange bath without departing from the spirit or the scope of the present invention. For example, as Alkali metal ions displace $Li^+$ ions in the glass, the $Li^+$ ions become part of the glass ion exchange bath. Hence, the concentration of Alkali metal ions in the glass ion exchange bath may change unless additional Alkali metal ions are added into the glass ion exchange bath.

Some embodiments may be implemented by software, but can also be implemented in hardware or a combination of hardware and software. Some implementations may be embodied as computer readable code on a tangible computer readable medium. The tangible computer readable medium is any data storage device that can store data which can thereafter be read by a computer system. Examples of tangible computer readable medium include read-only memory, random-access memory, CD-ROMs, DVDs, magnetic tape, and optical data storage devices.

This application references U.S. patent application Ser. No. 12/895,823 filed Sep. 30, 2010, and entitled "Enhanced Strengthening of Glass" (now US Patent Publication 2011/0067447), which is hereby incorporated herein by reference. This referenced application concerns, for example, use of multiple baths to provided enhanced chemical strengthening.

Although the above discussion primarily concerns monitoring a single chemical bath, these monitoring and processing approaches are also applicable to multiple baths.

The various aspects, features, embodiments or implementations of the invention described above can be used alone or in various combinations.

Different aspects, embodiments or implementations may, but need not, yield one or more of the following advantages. One advantage is that automating control and/or monitoring ion exchange may provide for greater efficiency and/or more consistent chemically strengthening of glass. Another advantage is that tighter tolerances for compressive surface stress, central tension and/or depth of compressive surface stress layer may be employed for strengthening glass. Another advantage is that glass ion exchange baths may be better managed.

Although only a few embodiments of the invention have been described, it should be understood that the invention may be embodied in many other specific forms without departing from the spirit or the scope of the present invention. By way of example, the steps associated with the methods of the invention may vary widely. Steps may be added, removed, altered, combined, and reordered without departing from the spirit of the scope of the invention. Similarly, while operations are depicted in the drawings in a particular order, this should not be understood as requiring that such operations be performed in the particular order shown or in sequential order, or that all illustrated operations be performed, to achieve desirable results.

While this specification contains many specifics, these should not be construed as limitations on the scope of the disclosure or of what may be claimed, but rather as descriptions of features specific to particular embodiment of the disclosure. Certain features that are described in the context of separate embodiments can also be implemented in combination. Conversely, various features that are described in the context of a single embodiment can also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A system for producing cover glass for exposed surfaces of consumer electronic products comprising:
    a glass ion exchange bath for chemically strengthening a cover glass by disposing the cover glass in the glass ion exchange bath; and
    a glass ion exchange monitor coupled to the glass ion exchange bath and programmed to monitor an amount of accumulated ions derived from the ion exchange occurring while the cover glass is within the glass ion exchange bath; and
    a controller electronically coupled to the glass ion exchange monitor and programmed to:
    determine the amount accumulated ions; and
    adjust one or more of:
        a temperature of the glass ion exchange bath, based at least in part on the amount of accumulated ions; or
        a duration that cover glass is to be disposed in the glass ion exchange bath, based at least in part on the amount of accumulated ions.

2. The system as recited in claim 1, wherein:
    the glass ion exchange bath has potassium ions for ion exchange with cover glass sodium ions; and
    the glass ion exchange monitor is programmed to monitor sodium ions in the glass ion exchange bath that are accumulated from ion exchange between cover glass sodium ions and the potassium ions in the glass ion exchange bath.

3. The system as recited in claim 1, wherein:
    the glass ion exchange bath has sodium ions for ion exchange with cover glass lithium ions; and
    the glass ion exchange monitor is programmed to monitor lithium ions in the glass ion exchange bath that are accumulated from ion exchange between cover glass lithium ions and the sodium ions in the glass ion exchange bath.

4. The system as recited in claim 1, wherein the glass ion exchange monitor comprises a sampler for sampling the glass ion exchange bath.

5. The system as recited in claim 1, wherein the glass ion exchange monitor comprises an analyzer to analyze accumulated ion derived from the ion exchange between cover glass and the glass ion exchange bath.

6. The system as recited in claim 1, wherein the glass ion exchange monitor comprises a comparator programmed to compare at least one predetermined threshold signal and a signal that is substantially related to an amount of accumulated ion derived from the ion exchange between cover glass and the glass ion exchange bath.

7. The system as recited in claim 1, wherein the glass ion exchange monitor comprises a comparator programmed to compare at least one predetermined threshold value and a value that is substantially related to an amount of accumulated ion derived from the ion exchange between cover glass and the glass ion exchange bath.

8. The system as recited in claim 1, wherein the controller is electronically coupled with the glass ion exchange monitor for receiving a signal that is substantially related to accumulated ion derived from the ion exchange between cover glass and the glass ion exchange bath.

9. The system as recited in claim 1, wherein
the controller is adapted for generating an indicator signal when the accumulated ion derived from the ion exchange in the glass ion exchange bath should be reduced based at least in part on the monitor signal.

10. A system as recited in claim 1 further comprising:
a heater for heating the glass ion exchange bath; and
wherein:
the controller is electronically coupled with the glass ion exchange monitor for receiving a monitor signal that is substantially related to the amount of accumulated ions; and
the controller is coupled with the heater for setting a temperature of the glass ion exchange bath based at least in part upon the monitor signal.

11. A system as recited in claim 1, wherein:
the controller is adapted for selecting a decreased temperature of the glass ion exchange bath; and
selecting the decreased temperature is based at least in part upon a predetermined amount of increase in accumulated ion derived from the ion exchange between cover glass and the glass ion exchange bath.

12. A system as recited in claim 1, further comprising:
a timer for timing the duration that the cover glass should be disposed in the glass ion exchange bath; and
wherein the controller is coupled with the timer for setting the timer based at least in part on the amount of accumulated ions.

13. A system as recited in claim 1, wherein:
the controller is programmed for selecting an increased duration that the cover glass should be disposed in the glass ion exchange bath;
the selecting the increased duration is based at least in part upon a predetermined amount of increase in the amount of accumulated ions.

14. A system to produce a cover glass for exposed surfaces of consumer electronic products comprising:
a glass ion exchange bath for chemically strengthening the cover glass by disposing the cover glass in the glass ion exchange bath;
a glass ion exchange monitor coupled to the glass ion exchange bath programmed to monitor an amount of accumulated ions derived from the ion exchange occurring while the cover glass is within the glass ion exchange bath; and
a controller electronically coupled with the glass ion exchange monitor and glass ion exchange bath, the controller programmed to:
(i) receive a signal related to the amount of accumulated ions;
(ii) determine if the amount of accumulated ions exceeds a predetermined partial-refresh threshold;
(iii) partially drain the glass ion exchange bath of a first solution if it is determined that the amount of accumulated ions exceeds the predetermined partial-refresh threshold; and
(iv) partially refill the glass ion exchange bath with a second solution.

15. The system as recited in claim 14, further comprising a timer to time a duration that the cover glass should be disposed in the glass ion exchange bath, wherein the timer is coupled to the controller to control the timer based at least in part upon the received signal.

16. The system as recited in claim 14, further comprising a heater coupled to the controller and glass ion exchange bath, wherein a temperature of the heater is set by the controller based at least in part upon the received signal.

17. The system as recited in claim 14, wherein the glass ion exchange monitor comprises:
an analyzer programmed to analyze the amount of accumulated ions; and
a comparator coupled to the analyzer programmed to compare a predetermined threshold ion exchange value with the amount of accumulated ions analyzed by the analyzer.

18. The system as recited in claim 17, wherein the controller is further programmed to control a duration that cover glass should be disposed in the glass ion exchange bath based at least in part upon the compared predetermined threshold ion exchange value with the amount of accumulated ions analyzed by the analyzer.

19. A method for producing a cover glass for exposed surfaces of consumer electronic products comprising:
disposing the cover glass in a glass ion exchange bath to be chemically strengthened;
monitoring, with a glass ion exchange monitor coupled to the glass ion exchange bath programmed to monitor an amount of accumulated ions, the amount of accumulated ions derived from the ion exchange occurring while the cover glass is in the glass ion exchange bath based on ions exchanged between the glass ion exchange bath and the cover glass;
receiving a signal substantially related to the amount of accumulated ions;
determining if at least one processing parameter of the glass ion exchange bath needs to be adjusted based on the received signal; and
adjusting one or more of:
a duration that the cover glass is disposed in the glass ion exchange bath, based at least in part upon on the monitored amount of accumulated ions; or
a temperature of the glass ion exchange bath, based at least in part on the monitored amount of accumulated ions.

20. The method as recited in claim 19, further comprising:
determining if the amount of accumulated ion exchange in the glass ion exchange bath should be decreased based on the monitored amount of accumulated ions; and
adjusting an amount of ion exchange in the glass ion exchange bath if it is determined that the amount of accumulated ions in the glass ion exchange bath should be decreased.

21. The method as recited in claim 19, further comprising:
determining if the monitored amount of accumulated ions in the glass ion exchange bath exceeds a predetermined partial-refresh threshold;
partially draining the glass ion exchange bath of a first solution if it is determined that the monitored amount of accumulated ions in the glass ion exchange bath exceeds a predetermined partial-refresh threshold; and
partially refilling the glass ion exchange bath with a second solution.

* * * * *